(12) United States Patent
Yokoyama

(10) Patent No.: US 10,913,433 B2
(45) Date of Patent: Feb. 9, 2021

(54) DISC BRAKE

(71) Applicant: TOYOTA JIDOSHA KABUSHIKI KAISHA, Toyota (JP)

(72) Inventor: Tomohiro Yokoyama, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 25 days.

(21) Appl. No.: 16/161,429

(22) Filed: Oct. 16, 2018

(65) Prior Publication Data

US 2019/0176781 A1    Jun. 13, 2019

(30) Foreign Application Priority Data

Dec. 8, 2017    (JP) ................. 2017-235824

(51) Int. Cl.
*F16D 55/2265*    (2006.01)
*B60T 1/06*    (2006.01)
(Continued)

(52) U.S. Cl.
CPC ............ *B60T 1/065* (2013.01); *F16D 55/227* (2013.01); *F16D 55/2265* (2013.01); *F16D 65/0025* (2013.01); *F16D 65/0056* (2013.01); *F16D 65/18* (2013.01); *F16D 65/0006* (2013.01); *F16D 65/0068* (2013.01); *F16D 65/0972* (2013.01); *F16D 65/0978* (2013.01); *F16D 65/38* (2013.01); *F16D 2055/007* (2013.01); *F16D 2055/0008* (2013.01); *F16D 2055/0025* (2013.01); *F16D 2055/0041* (2013.01);
(Continued)

(58) Field of Classification Search
CPC ............... F16D 55/0016; F16D 55/002; F16D 55/0025; F16D 2055/0041; F16D 65/0025; F16D 65/0068; F16D 65/0075; F16D 2055/0016; F16D 2055/002; F16D 2055/0025
USPC ....................................................... 188/73.47
See application file for complete search history.

(56) References Cited

U.S. PATENT DOCUMENTS 3,207,268 A * 9/1965 Mossey ................. F16D 55/226
   188/72.5
3,245,500 A * 4/1966 Hambling ........... F16D 55/2262
   188/72.6
(Continued)

FOREIGN PATENT DOCUMENTS

GB    1147639 A    4/1969
JP    55-175641 U    6/1979
(Continued)

*Primary Examiner* — Bradley T King
(74) *Attorney, Agent, or Firm* — Sughrue Mion, PLLC

(57) ABSTRACT

A disc brake includes: an inner pad and an outer pad; a pressing device configured to press the inner pad and the outer pad against a rotor, the pressing device including a first presser member and a second presser member that are movable parallel to a rotational axis of the rotor, and a frame that is a frame-shaped rigid body and is movable in the direction parallel to the rotational axis; and a housing mounted on a non-rotating body, the housing holding the pressing device, the housing including a pad pin that hold the inner pad and the outer pad so as to be movable in the direction parallel to the rotational axis, the pad pin being held by the housing at both ends of the pad pin in the direction parallel to the rotational axis.

10 Claims, 14 Drawing Sheets

(51) Int. Cl.
  F16D 65/00   (2006.01)
  F16D 55/227  (2006.01)
  F16D 65/18   (2006.01)
  F16D 121/04      (2012.01)
  F16D 55/00       (2006.01)
  F16D 65/097      (2006.01)
  F16D 125/06      (2012.01)
  F16D 65/38       (2006.01)
  F16D 121/24      (2012.01)
  F16D 125/40      (2012.01)
  F16D 127/02      (2012.01)

(52) U.S. Cl.
  CPC ...... *F16D 2121/04* (2013.01); *F16D 2121/24* (2013.01); *F16D 2125/06* (2013.01); *F16D 2125/40* (2013.01); *F16D 2127/02* (2013.01); *F16D 2200/003* (2013.01); *F16D 2200/0021* (2013.01); *F16D 2200/0052* (2013.01)

(56) References Cited

U.S. PATENT DOCUMENTS

| | | | | |
|---|---|---|---|---|
| 3,402,790 A | * | 9/1968 | Rath | F16D 65/092 188/72.5 |
| 3,421,602 A | * | 1/1969 | Craske | F16D 55/2262 188/73.43 |
| 3,421,603 A | * | 1/1969 | Hermann | F16D 65/18 188/72.4 |
| 3,442,353 A | * | 5/1969 | Harrison | F16D 55/226 188/73.45 |
| 3,493,084 A | * | 2/1970 | Maurice | F16D 55/2262 188/72.5 |
| 3,543,887 A | * | 12/1970 | Hodkinson | F16D 55/2262 188/73.43 |
| 3,625,314 A | * | 12/1971 | Rinker | F16D 55/2262 188/72.4 |
| 3,625,316 A | | 12/1971 | Mori | |
| 3,656,589 A | * | 4/1972 | Kawabe | F16D 55/226 188/72.5 |
| 3,692,151 A | * | 9/1972 | Kobayashi | F16D 55/226 188/72.5 |
| 3,719,257 A | * | 3/1973 | Maurice | F16D 55/226 188/73.39 |
| 3,724,606 A | | 4/1973 | Kobayashi | |
| 3,912,051 A | * | 10/1975 | Yokoi | F16D 55/226 188/72.5 |
| 3,933,226 A | * | 1/1976 | Maurice | F16D 55/226 188/72.5 |
| 4,055,237 A | * | 10/1977 | Numazawa | F16D 55/226 188/73.35 |
| 4,067,418 A | * | 1/1978 | Rath | F16D 55/22 188/72.4 |
| 4,085,829 A | | 4/1978 | Shimizu | |
| 4,776,435 A | | 10/1988 | Morita | |
| 6,105,734 A | * | 8/2000 | Kuhne | F16D 55/226 188/71.1 |
| 6,695,099 B1 | * | 2/2004 | Waag | F16D 55/228 188/70 R |
| 2004/0188190 A1 | * | 9/2004 | Niwa | F16D 65/0025 188/73.37 |
| 2013/0256068 A1 | | 10/2013 | Hazeki et al. | |
| 2017/0097057 A1 | | 4/2017 | Burgoon | |

FOREIGN PATENT DOCUMENTS

| | | |
|---|---|---|
| JP | 2013-194890 A | 9/2013 |
| JP | 2013-204742 A | 10/2013 |
| JP | 2014-514520 A | 6/2014 |
| JP | 2016-102512 A | 6/2016 |
| JP | 2016-102573 A | 6/2016 |
| SU | 452971 A3 | 12/1974 |
| WO | 2012/153355 A1 | 11/2012 |

* cited by examiner

VEHICLE INNER SIDE ⟵⟶ VEHICLE OUTER SIDE

DISC BRAKE

INCORPORATION BY REFERENCE

The disclosure of Japanese Patent Application No. 2017-235824 filed on Dec. 8, 2017 including the specification, drawings and abstract is incorporated herein by reference in its entirety.

BACKGROUND

1. Technical Field

The present disclosure relates to a disc brake.

2. Description of Related Art

Japanese Utility Model Application Publication No. 55-175641 (JP 55-175641 U), Japanese Patent Application Publication No. 2016-102573 (JP 2016-102573 A), and Japanese Patent No. 6001647 describe a disc brake including: (a) a rotor that rotates along with a wheel; (b) an inner pad and an outer pad located respectively on both sides of the rotor; (c) a pressing device that presses the inner pad and the outer pad against the rotor; and (d) a housing that holds the pressing device and holds the inner pad and the outer pad. The disc brake described in JP 55-175641 U is of a floating type, and the pressing device thereof includes a frame, which is held by the housing so as to be relatively movable. The inner pad and the outer pad are held by the housing through pad pins, and each of these pad pins is held at one end by the housing while the other end is free.

The disc brakes described in JP 2016-102573 A and Japanese Patent No. 6001647 are of an opposed-piston type, with the pressing device provided in the housing. Cylinder bores are formed in the housing respectively on both sides of the rotor, and an inner piston and an outer piston are fluid-tightly and slidably fitted in these cylinder bores. The inner pad is pressed against the rotor by the inner piston, and the outer pad is pressed against the rotor by the outer piston. The housing described in Japanese Patent No. 6001647 is at least partially manufactured from carbon fiber-reinforced plastic. Weight reduction of the disc brake is thereby achieved.

SUMMARY

An object of the present disclosure is to improve a floating disc brake in which a pressing device includes a frame. This means, for example, to allow the inner pad and the outer pad to be stably held by the housing, and to allow the floating disc brake to be appropriately applied.

A disc brake according to a first aspect of the disclosure includes: an inner pad and an outer pad located so as to sandwich a rotor that rotates along with a wheel; a pressing device configured to press the inner pad and the outer pad against the rotor, the pressing device including a first presser member and a second presser member that are movable parallel to a rotational axis of the rotor, the first presser member being movable in a direction toward the rotor, the second presser member being movable in a direction away from the rotor and a frame that is a frame-shaped rigid body, the frame including a first edge facing the outer pad and a second edge separated from the first edge in a direction parallel to the rotational axis of the rotor and engaging with the second presser member, the frame being movable in the direction parallel to the rotational axis; and a housing mounted on a non-rotating body, the housing holding the pressing device and holding the inner pad and the outer pad, the housing including a pad pin that hold the inner pad and the outer pad so as to be movable in the direction parallel to the rotational axis, the pad pin being held by the housing at both ends of the pad pin in the direction parallel to the rotational axis.

According to the first aspect, the inner pad and the outer pad can be stably held by the housing.

In the first aspect, the housing may include a main housing section holding the pressing device, and a bridge extending from the main housing section beyond the rotor to an opposite side of the rotor from the main housing section, and the pad pin may be held at one end by the main housing section and held at the other end by the bridge.

In the first aspect, the housing may include a main housing section that holds the pressing device, and a plurality of engaged portions provided in the main housing section; the frame may include a plurality of engaging portions engageable with the plurality of engaged portions, and the frame may be held by the main housing section as the plurality of engaging portions is engaged with the plurality of engaged portions; and first elastic members that are elastic members may be each provided between at least one of the plurality of engaging portions and at least one of the plurality of engaged portions.

In the above configuration, each of the first elastic members may have a corrosion potential between a corrosion potential of the frame and a corrosion potential of the housing.

In the above aspect, the housing may include a main housing section that holds the pressing device, and a plurality of engaged portions that is provided at portions of the main housing section on both sides in a direction orthogonal to the rotational axis so as to be separated from each other in the direction parallel to the rotational axis. The frame may include a third edge a fourth edge, and a plurality of engaging portions, the third edge and the fourth edge being provided so as to be separated from each other in the direction orthogonal to the rotational axis and each couple together the first edge and the second edge, the plurality of engaging portions being provided at portions of the third edge and the fourth edge facing each other and engageable with the plurality of engaged portions. The frame may be held by the main housing section as the plurality of engaging portions is respectively engaged with the plurality of engaged portions. In a side view of the frame, a center of gravity of the frame may be located between those of the plurality of engaged portions that are located at both ends.

In the first aspect, the frame may have a protrusion that is provided at a portion of the second edge facing the second presser member and that protrudes in the direction parallel to the rotational axis. The second presser member may have a recess that is provided at a portion corresponding to the protrusion and recessed in the direction parallel to the rotational axis. A second elastic member that is an elastic member may be provided between the protrusion and the recess, and the second edge is engaged with the second presser member through the second elastic member.

In the above configuration, the protrusion may have a shape defined by a curved surface in a circumferential direction of the rotor.

In the first aspect, the frame may include a third edge and a fourth edge that are provided so as to be separated from each other in a direction orthogonal to the rotational axis, each connect the first edge and the second edge to each other, and extend above the rotor but not above the inner pad and the outer pad.

In the above configuration, when a straight line passing through a center of the first presser member and a center of the second presser member is defined as a center line, a straight line orthogonal to the center line and the rotational axis of the rotor is defined as a reference line, and a plane orthogonal to the reference line and including the center line is defined as a central reference plane, a centroid of each of a plurality of cross-sections of the third edge and the fourth edge extending in the direction orthogonal to the rotational axis may be located in the central reference plane.

In the first aspect, when a straight line passing through a center of the first presser member and a center of the second presser member is defined as a center line, a straight line orthogonal to the center line and the rotational axis of the rotor is defined as a reference line, and a plane orthogonal to the reference line and including the center line is defined as a central reference plane, a centroid of each of a plurality of cross-sections of the first edge and the second edge extending in the direction parallel to the rotational axis may be located in the central reference plane.

In the first aspect, the housing may include a plurality of the pad pins and both ends of each of the plurality of the pad pins in the direction parallel to the rotational axis may be held by the housing.

A disc brake according to a second aspect of the disclosure includes: an inner pad and an outer pad located so as to sandwich a rotor that rotates along with a wheel; a pressing device configured to press the inner pad and the outer pad against the rotor; and a housing that is mounted on a non-rotating body and holds the pressing device and holds the inner pad and the outer pad. The pressing device includes a first presser member and a second presser member that are movable parallel to a rotational axis of the rotor, the first presser member being movable in a direction toward the rotor, the second presser member being movable in a direction away from the rotor and a frame that is a frame-shaped rigid body, the frame including a first edge facing the outer pad, a second edge separated from the first edge in a direction parallel to a rotational axis of the wheel and engaging with the second presser member, and a third edge and a fourth edge separated from each other in a direction orthogonal to the rotational axis and extending in a direction intersecting the first edge and the second edge, is the frame being movable in the direction parallel to the rotational axis. When a straight line passing through a center of the first presser member and a center of the second presser member is defined as a center line, a straight line orthogonal to the center line and the rotational axis of the rotor is defined as a reference line, and a plane orthogonal to the reference line and including the center line is defined as a central reference plane, a centroid of each of a plurality of cross-sections of the third edge and the fourth edge extending in the direction orthogonal to the rotational axis is located in the central reference plane.

According to the second aspect, deformation of the frame in an applied state of the disc brake can be suppressed, so that a decrease in a pressing force due to deformation of the frame etc. can be appropriately avoided. It should be noted that JP 55-175641 U does not mention that the centroid of each of a plurality of cross-sections of a third edge and a fourth edge of the frame extending in a direction orthogonal to the rotational axis is located in a central reference plane.

In the second aspect, a centroid of each of a plurality of cross-sections of the first edge and the second edge extending in the direction parallel to the rotational axis may be located in the central reference plane.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
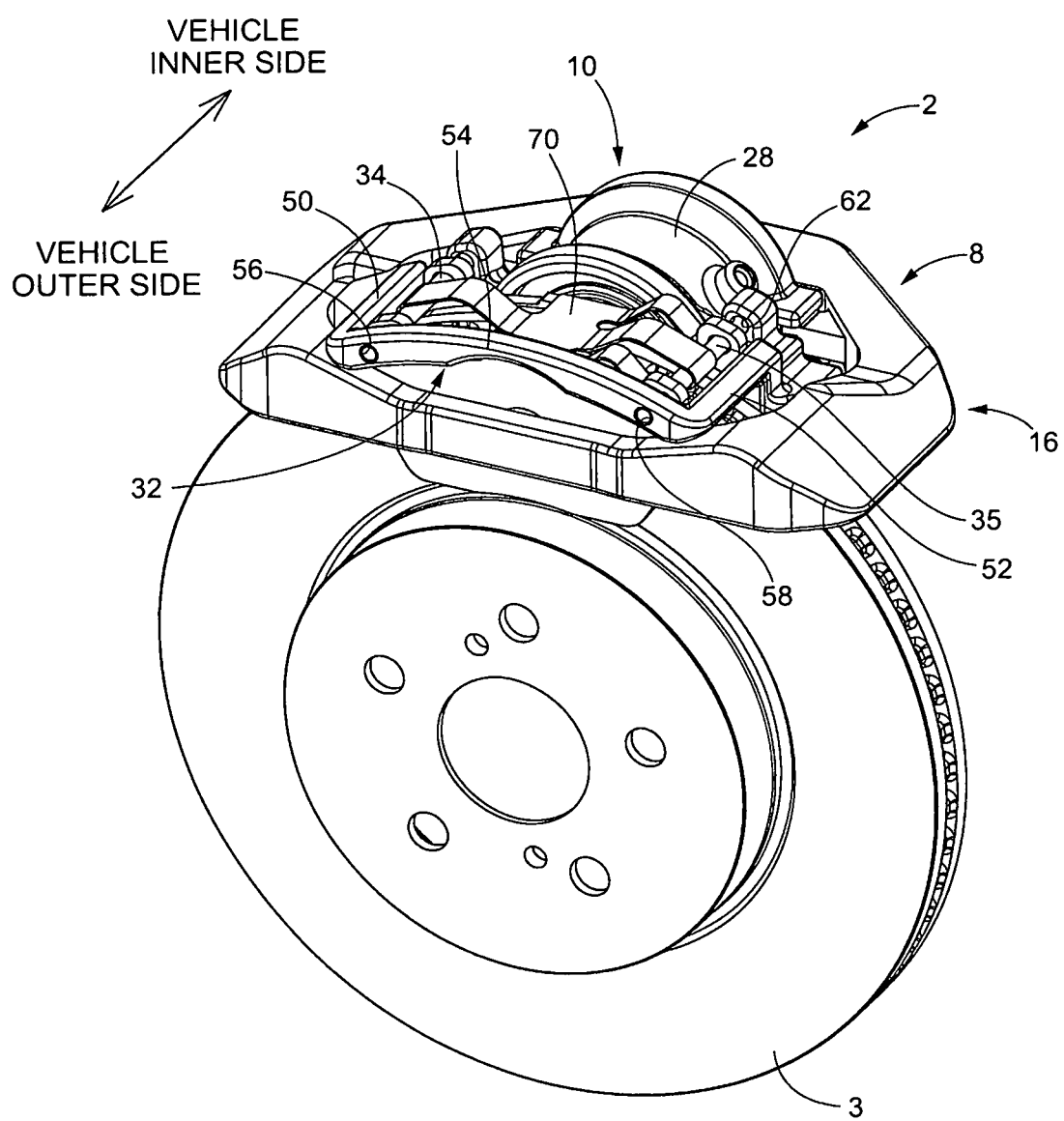
FIG. 1 is a perspective view of a disc brake according to Embodiment 1 of the present disclosure.

In the following, a disc brake that is an embodiment of the present disclosure and provided on a wheel of a vehicle will be described based on the drawings.

A. General Description

The disc brake according to this embodiment is of a floating type, and is a hydraulic disc brake that is actuated by a fluid pressure. As shown in FIG. 1 to FIG. 4, a floating hydraulic disc brake 2 includes: (I) an inner pad 4 and an outer pad 6 located so as to sandwich a rotor 3 that is rotated along with a wheel; (II) a pressing device 8; and (III) a housing 10 that holds the pressing device 8. The pressing device 8 includes a wheel cylinder 14 and a frame 16.

The wheel cylinder 14 includes a first piston 24 as a first presser member and a second piston 26 as a second presser member that are fluid-tightly and slidably fitted in a cylinder bore 21 formed in a main housing section 28 of the housing 10, and a space in the cylinder bore 21 between the first piston 24 and the second piston 26 serves as a fluid pressure chamber 30. Thus, the wheel cylinder 14 is provided inside the main housing section 28. It can be regarded that a part of the main housing section 28 at which the cylinder bore 21 is formed is a main body of the wheel cylinder 14, and that the wheel cylinder 14 is held by the main housing section 28. The frame 16 is a frame-shaped rigid body, and is held by the main housing section 28 so as to be relatively movable in a direction parallel to a rotational axis L of the rotor 3.

Figure 2:
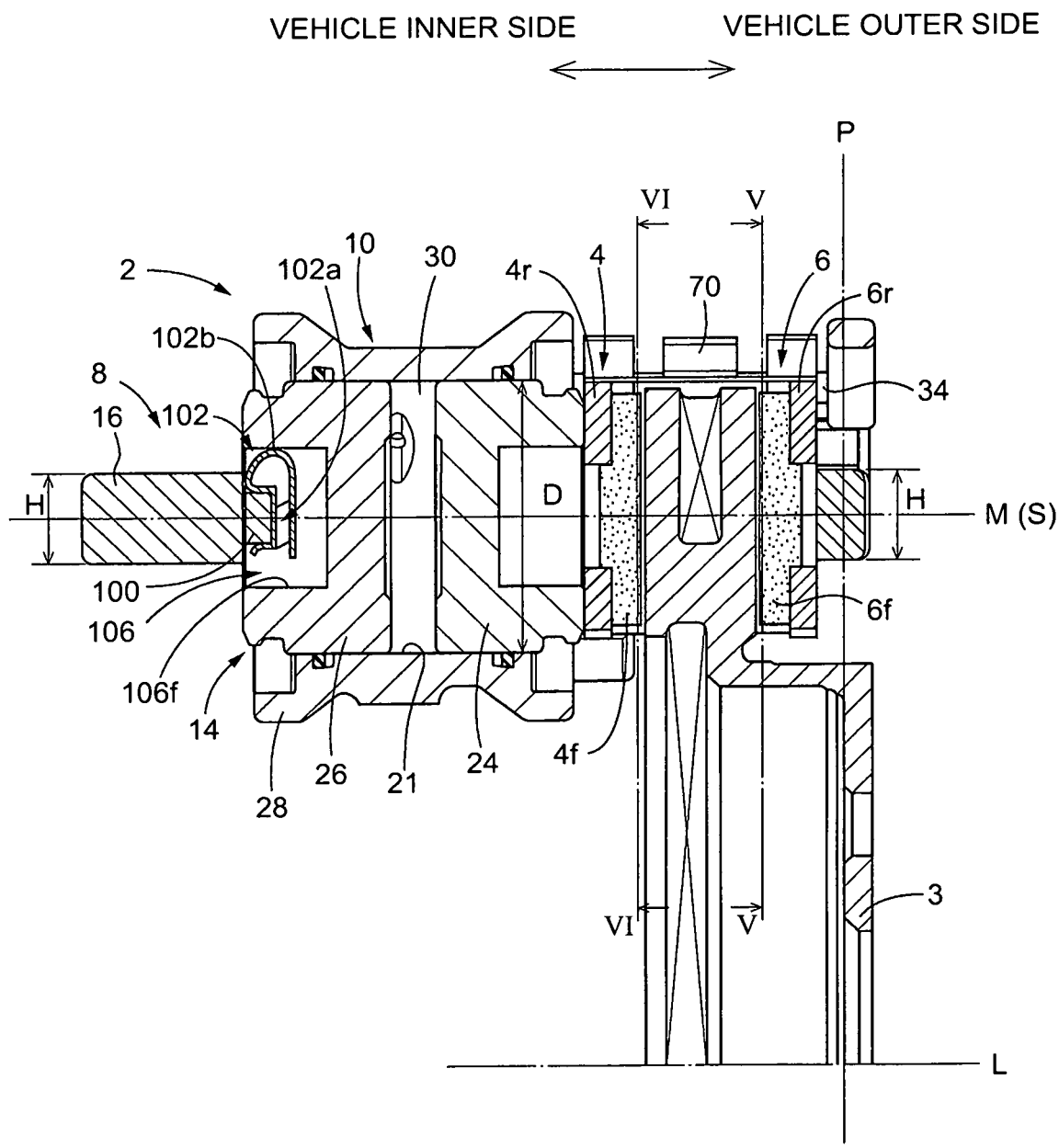
FIG. 2 is a sectional view showing main parts of the disc brake.

Since the rotational axis L of the rotor 3 is parallel to an axis M of the pressing device 8, a direction parallel to the rotational axis L of the rotor 3 may be hereinafter referred to as an axial direction of the pressing device 8, or simply as an axial direction, or as a direction parallel to the axis M. As shown in FIG. 1 and FIG. 2, in a direction parallel to the axis M, a side on which the main housing section 28 is located is a vehicle inner side and a side on which the outer pad 6 is located is a vehicle outer side.

Figure 11:
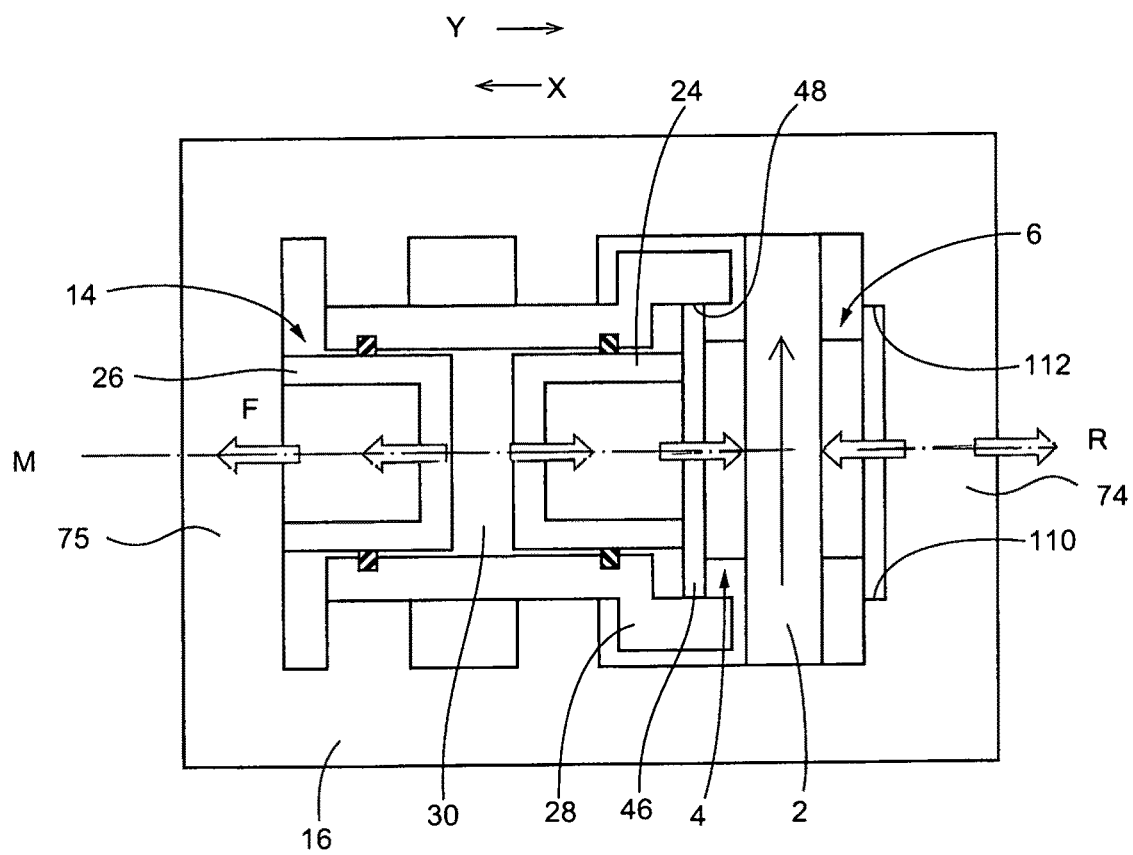
FIG. 11 is a view schematically showing actuation of the disc brake.

As shown in FIG. 11, the disc brake 2 is actuated when a fluid pressure is supplied to the fluid pressure chamber 30 of the wheel cylinder 14. The first piston 24 and the second piston 26 are moved parallel to the axis M, respectively in a direction toward the rotor 3 and in a direction away from the rotor 3. The first piston 24 presses the inner pad 4 against the rotor 3, while the second piston 26 moves the frame 16 in the direction of an arrow X. As the frame 16 moves in the direction of the arrow X, the outer pad 6 is pressed against the rotor 3. The rotor 3 is pressed from both sides by the inner pad 4 and the outer pad 6, and thus the disc brake 2 is applied. A detailed description follows.

B. Inner Pad and Outer Pad

The inner pad 4 includes a back plate 4r and a friction-engaging member 4f, and the outer pad 6 includes a back plate 6r and a friction-engaging member 6f.

C. Housing

The housing 10 includes: (a) the main housing section 28; (b) a bridge 32 extending from the main housing section 28 beyond the rotor 3; and (c) a pair of pad pins 34, 35 provided so as to be separated from each other in a circumferential direction of the rotor 3. The main housing section 28 extends substantially in the axial direction, and the cylinder bore 21 is formed inside the main housing section 28 so as to extend therethrough in a direction parallel to the axis M. Each of the first piston 24 and the second piston 26 has a shape of a hollow cylinder closed at one end, and are fitted in the cylinder bore 21 concentrically and in series in the axial direction, with bottoms thereof facing the fluid pressure chamber 30.

A pair of mounted portions 36, 37 is provided at an end of the main housing section 28 on a side closer to the rotor 3 in the axial direction, respectively on both sides of this end in a direction orthogonal to the axis M. Each of the mounted portions 36, 37 extends toward an inner side in a radial direction of the rotor 3 and is mounted to a suspension member, such as a knuckle, that is a non-rotating body (this suspension member can also be referred to as a vehicle body-side member).

Figure 3:
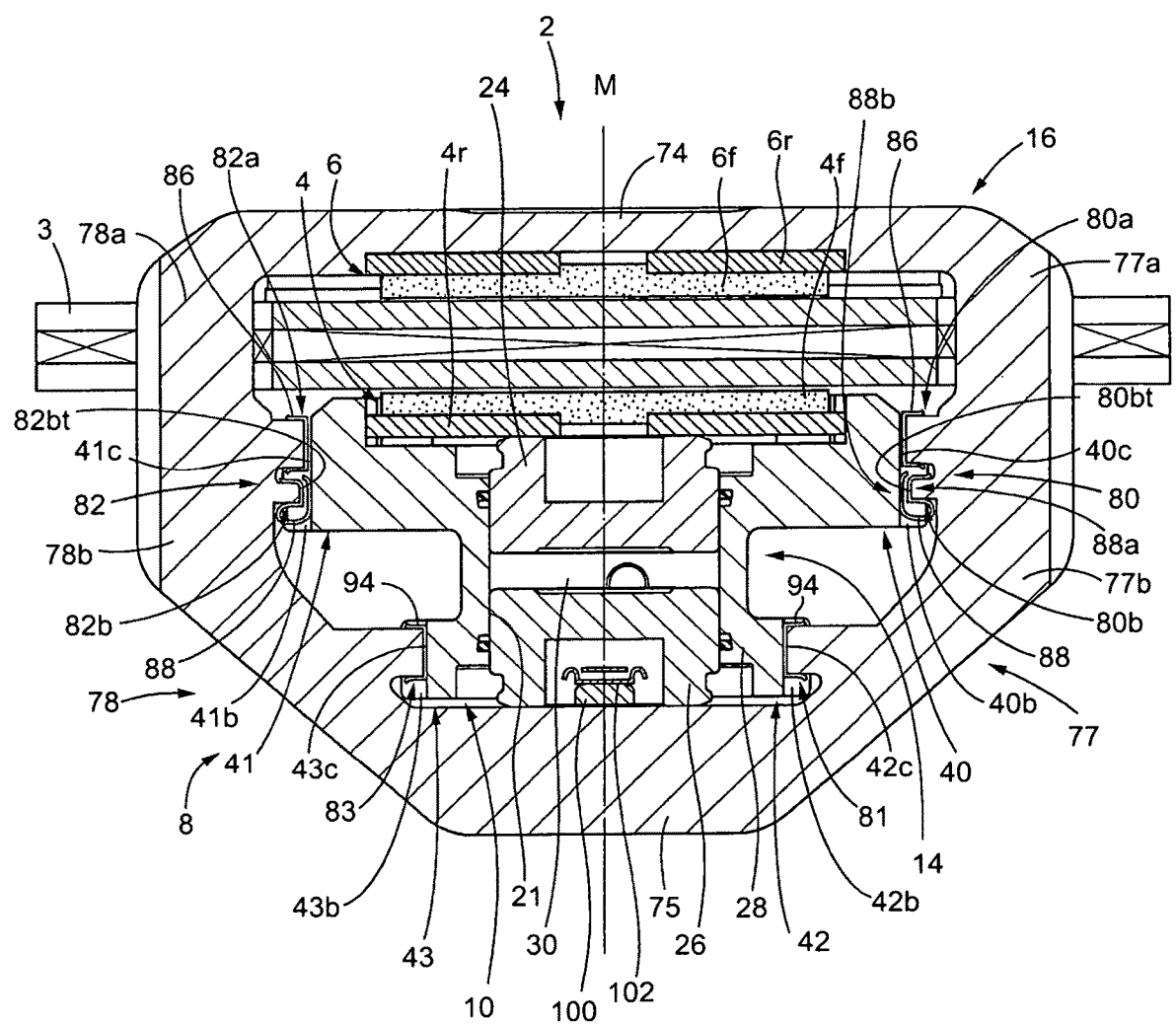
FIG. 3 is a sectional view of a pressing device of the disc brake.
Figure 4:
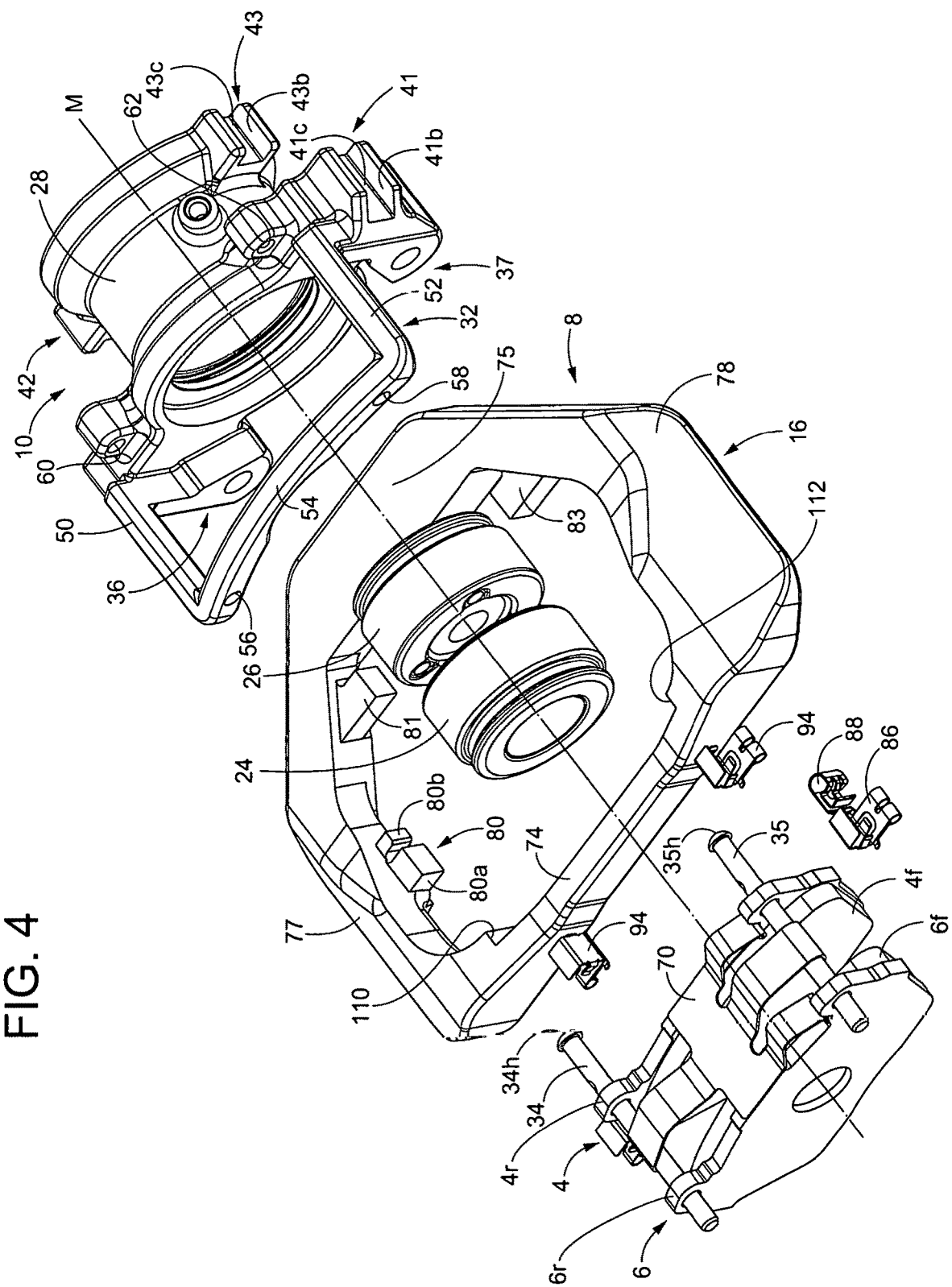
FIG. 4 is an exploded perspective view of main parts of the disc brake.
Figure 6:
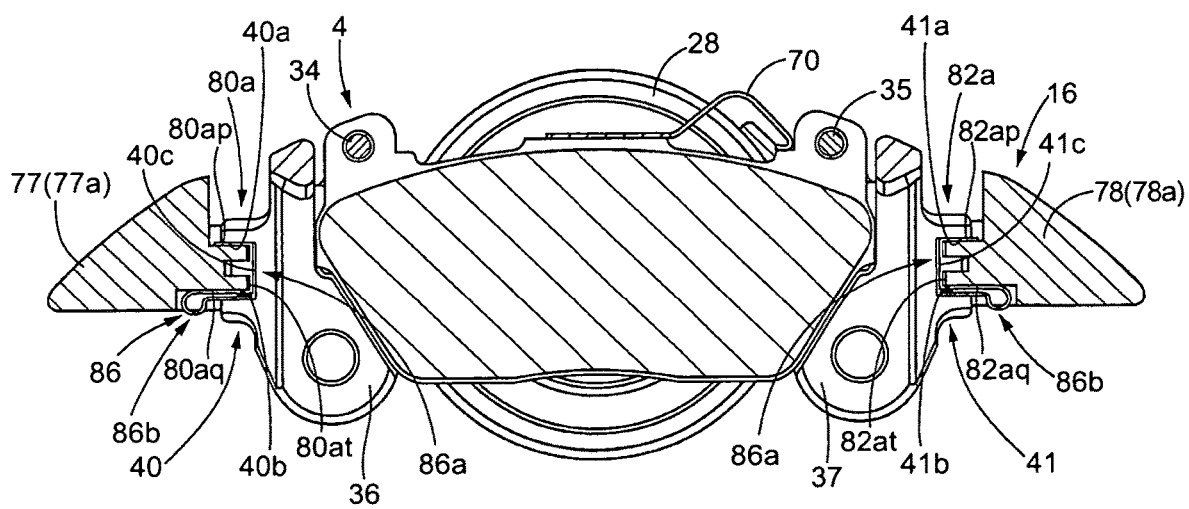
FIG. 6 is a view of section VI-VI in FIG. 2.

Two pairs of engaged portions that can engage with the frame 16 are provided respectively at both ends of the main housing section 28 in the axial direction. As shown in FIG. 3 and FIG. 4, first engaging recesses 40, 41 that are one pair of engaged portions of the two pairs of engaged portions are provided at the end of the main housing section 28 on the side closer to the rotor 3, respectively on both sides of this end in a direction orthogonal to the axis M, while second engaging recesses 42, 43 that are the other pair of engaged portions are provided at an end of the main housing section 28 on a side farther away from the rotor 3, respectively on both sides of this end in a direction orthogonal to the axis M. In this embodiment, as shown in FIG. 6, the first engaging recesses 40, 41 are provided in the mounted portions 36, 37. Center points of the first engaging recesses 40, 41 and the second engaging recesses 42, 43 in the radial direction are all located roughly in a central reference plane S. The central reference plane S is a plane that is orthogonal to a reference line P and includes the axis M. The reference line P is a line that is orthogonal to the rotational axis L of the rotor 3 and to a center line (the same as the axis M) passing through the center of the first piston 24 and the center of the second piston 26.

Each of the first engaging recesses 40, 41 and the second engaging recesses 42, 43 has a groove extending in the axial direction. For example, as shown in FIG. 4 and FIG. 6, the first engaging recess 41 has a pair of wall surfaces 41a, 41b separated from each other in the radial direction of the rotor 3 (hereinafter may be referred to simply as the radial direction) and a bottom surface 41c located between the wall surfaces 41a, 41b. The wall surfaces 41a, 41b are surfaces each extending parallel to the central reference plane S. Similarly, each of the first engaging recess 40 and the second engaging recesses 42, 43 also has a pair of wall surfaces and a bottom surface.

As shown in FIG. 4, the bridge 32 is substantially U-shaped as seen in a plan view, and is fixed at one end to one of the mounted portions 36, 37 and fixed at the other end to the other of the mounted portions 36, 37. The bridge 32 includes a first rod 50 that extends in the axial direction, a second rod 52 that extends parallel to the first rod 50 and is separated from the first rod 50 in the circumferential direction of the rotor 3, and a coupling part 54 that couples together the first rod 50 and the second rod 52 on the opposite side of the rotor 3 from the main housing section 28. In this embodiment, the coupling part 54, which extends in a direction orthogonal to the axis M as seen in a plan view, may have any shape. Through-holes 56, 58 extending in the axial direction are formed respectively at both ends of the coupling part 54 in the circumferential direction of the rotor 3. Through-holes 60, 62 extending in the axial direction are formed at portions of the main housing section 28 corresponding to the through-holes 56, 58.

The pad pins 34, 35 extend in the axial direction and respectively have heads 34h, 35h provided at one end. The pad pins 34, 35 are passed through the through-holes 60, 62, through-holes formed in the back plates 4r, 6r of the inner pad 4 and the outer pad 6, and the through-holes 56, 58, in this order.

The pad pins 34, 35 are held at one end by the main housing section 28 and held at the other end by the bridge 32, and are thus held at both ends by the housing 10. The heads 34h, 35h of the pad pins 34, 35 are located on the vehicle inner side of the through-holes 60, 62 of the main housing section 28, and split pins are mounted on portions of the pad pins 34, 35 on the opposite side from the through-holes 60, 62 (the rotor side). Thus, the pad pins 34, 35 are prevented from falling out. Since the heads 34h, 35h are located on the vehicle inner side of the rotor 3, dropping of the pad pins 34, 35 toward the vehicle outer side is prevented.

Thus, the inner pad 4 and the outer pad 6 are held by the pad pins 34, 35 so as to be movable in the axial direction, but turning of the inner pad 4 and the outer pad 6 around the pad pins 34, 35 is prevented by the pad pins being provided so as to be separated from each other in the circumferential direction.

A pad spring 70 that is a leaf spring is mounted between the pad pins 34, 35, on a portion corresponding to an outer side of the friction-engaging members 4f, 6f in the radial direction. The pad spring 70 applies an elastic force to each of the inner pad 4 and the outer pad 6 in the radial direction and the circumferential direction, as well as applies an elastic force to the pad pins 34, 35 in a direction in which the pad pins 34, 35 are brought closer to each other. The pad spring 70 reduces backlash of the inner pad 4 and the outer pad 6 and thereby reduces vibration and abnormal noise.

D. Frame

Figure 7:
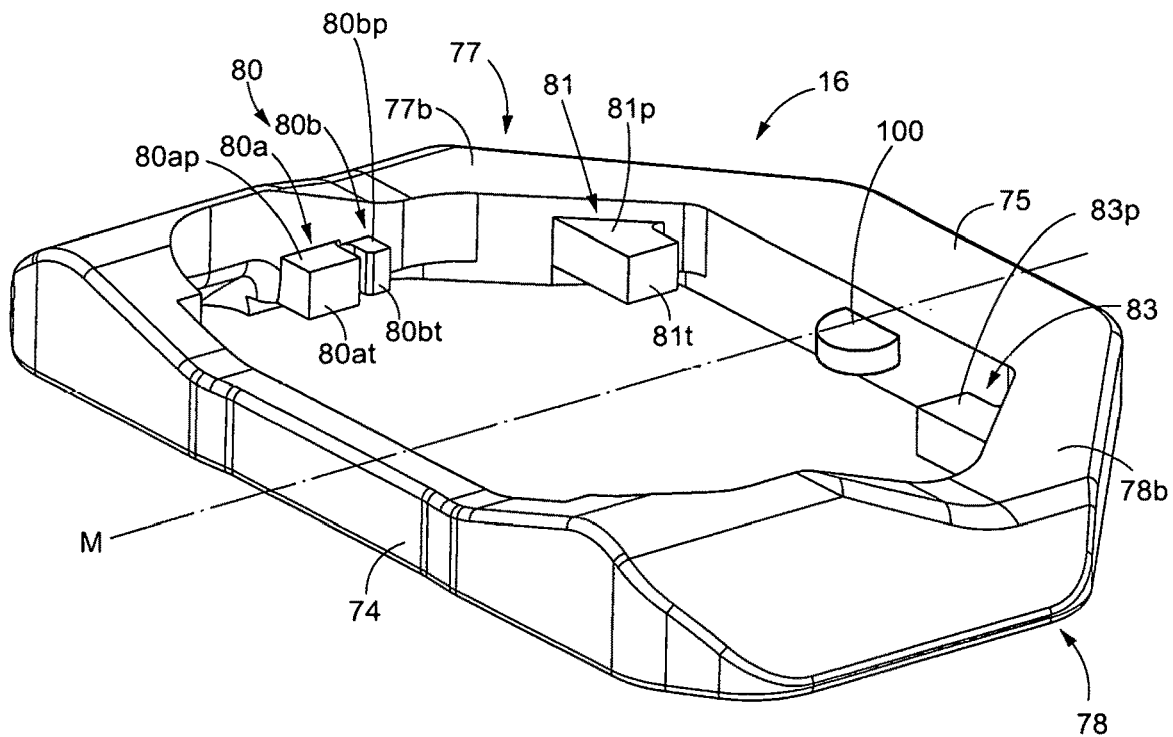
FIG. 7 is a perspective view showing a frame of the pressing device.

As shown in FIG. 3, FIG. 4, and FIG. 7, the frame 16 is a substantially frame-shaped rigid body, and includes (i) a first edge 74 and a second edge 75 that extend in a direction orthogonal to the axis M and are provided so as to be separated from each other in the axial direction, and (ii) a third edge 77 and a fourth edge 78 that extend in a direction intersecting the first edge 74 and the second edge 75 and are provided so as to be separated from each other in a direction orthogonal to the axis M. The third edge 77 and the fourth edge 78 each couple together the first edge 74 and the second edge 75.

The first edge 74 and the second edge 75 are located on the opposite sides of the rotor 3 in the axial direction. The first edge 74 is located farther on the vehicle outer side than the rotor 3 and faces the outer pad 6. The second edge 75 is located farther on the vehicle inner side than the rotor 3 and engaged with the second piston 26.

Figure 5:
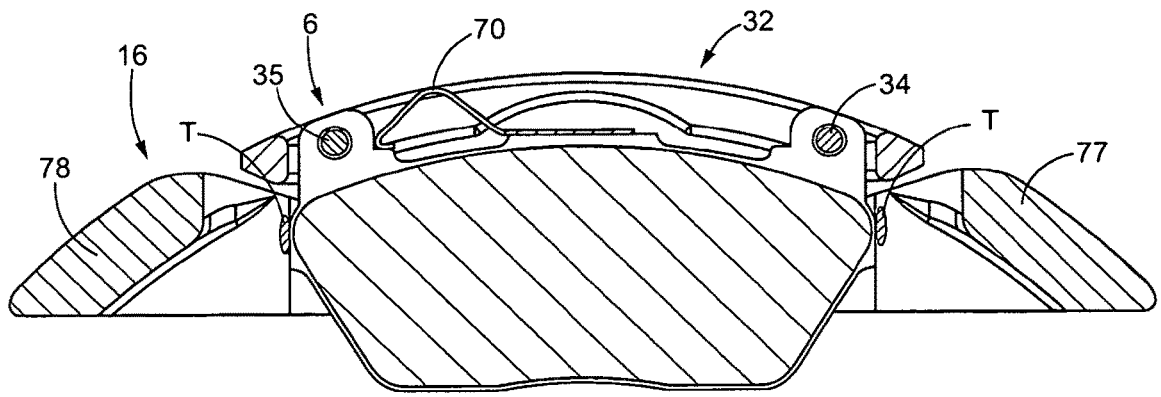
FIG. 5 is a view of section V-V in FIG. 2.

Both the third edge 77 and the fourth edge 78 are provided so as to extend toward the vehicle inner side and outer side of the rotor 3, by passing above the rotor 3 but not above the outer side of the inner pad 4 and the outer pad 6 in the radial direction as shown in FIG. 5 and FIG. 6. In other words, as shown in FIG. 3, FIG. 4, and FIG. 7, the third edge 77 and the fourth edge 78 are curved, and an interval between portions 77a, 78a thereof located on the outer side of the rotor 3 in the radial direction is larger than an interval between portions 77b, 78b thereof located farther on the vehicle inner side than the rotor 3 (these portions may be hereinafter referred to as inner portions). The inner pad 4 and the outer pad 6 are located between the portions 77a, 78a having a larger interval.

Two pairs of engaging portions are provided in side surfaces of the inner portions 77b, 78b of the third edge 77 and the fourth edge 78 facing each other, so as to be separated from each other in the axial direction. First engaging protrusions 80, 82 that are one pair of engaging portions of the two pairs of engaging portions are located respectively at ends of the inner portions 77b, 78b on the rotor side, while second engaging protrusions 81, 83 that are the other pair of engaging portions are located respectively at ends of the inner portions 77b, 78b on a side away from the rotor 3.

The first engaging protrusions 80, 82 and the second engaging protrusions 81, 83 are shaped so as to be able to respectively engage with the first engaging recesses 40, 41 and the second engaging recesses 42, 43. Center points of the first engaging protrusions 80, 82 and the second engaging protrusions 81, 83 in the radial direction are located roughly in the central reference plane S.

The first engaging protrusions 80, 82 each include two protruding portions provided with a clearance left therebetween in the axial direction. Specifically, the first engaging protrusion 80 includes two protruding portions 80a, 80b, and the first engaging protrusion 82 includes two protruding portions 82a, 82b. The first engaging protrusions 80 (80a, 80b), 82 (82a, 82b) and the second engaging protrusions 81, 83 each have a substantially rectangular parallelepiped shape protruding in a direction orthogonal to the axis M, and each have a pair of side surfaces separated from each other in the radial direction and parallel to the central reference plane S, a top surface located between these side surfaces, etc. For example, as shown in FIG. 3, FIG. 6, and FIG. 7, the protruding portion 80a of the first engaging protrusion 80 has side surfaces 80ap, 80aq and a top surface 80at. Similarly, the first engaging protrusion 82 and the second engaging protrusions 81, 83 each have a pair of side surfaces parallel to the central reference plane S and a top surface.

The frame 16 is held by the main housing section 28 as the first engaging protrusions 80, 82 and the second engaging protrusions 81, 83 of the frame 16 are respectively engaged with the first engaging recesses 40, 41 and the second engaging recesses 42, 43 of the main housing section 28. In this case, center points of the first engaging protrusions 80, 82 and the second engaging protrusions 81, 83 in the radial direction and the center points of the first engaging recesses 40, 41 and the second engaging recesses 42, 43 in the radial direction are all located in the central reference plane S. Accordingly, the frame 16 is held by the main housing section 28 in the same plane as the central reference plane S. In other words, center points of holding portions of the frame 16 in the main housing section 28 in the radial direction (these center points may be hereinafter referred to as holding points) are located in the central reference plane S. The holding portion is a portion at which an engaging protrusion and an engaging recess are engaged with each other.

The first engaging protrusions 80, 82 and the second engaging protrusions 81, 83 each have the pair of side surfaces extending parallel to the central reference plane S, and the first engaging recesses 40, 41 and the second engaging recesses 42, 43 each have the pair of wall surfaces extending parallel to the central reference plane S. Engagement between these side surfaces and wall surfaces, i.e., surface-to-surface engagement, can be established. As a result, the frame 16 is held by the main housing section 28 so as to be movable in a direction parallel to the axis M. Moreover, inclination of the frame 16 relative to the main housing section 28 is reduced.

On the other hand, in this embodiment, leaf springs as elastic members are provided between the first engaging protrusions 80, 82 and the first engaging recesses 40, 41 and between the second engaging protrusions 81, 83 and the second engaging recesses 42, 43. Specifically, a radial spring 86 is mounted on each of the protruding portion 80a of the first engaging protrusion 80 and the protruding portion 82a of the first engaging protrusion 82. A circumferential spring 88 is mounted on each of the protruding portion 80b and the protruding portion 82b. A radial spring 94 is mounted on each of the second engaging protrusions 81, 83.

Figure 8:
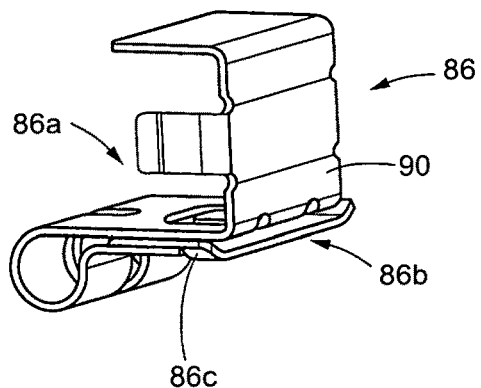
FIG. 8 is a perspective view showing a spring that is a component of the disc brake.

As shown in FIG. 8, the radial spring 86 is formed by curving a plate member 90 having an elongated shape, and includes a fitting part 86a that is bent into a substantially U-shape, and a spring part 86b that is formed by being folded so as to leave a clearance to a side surface of the fitting part 86a. Portions of an end of the spring part 86b are bent relative to the axial direction so as to form inclined portions 86c. For example, as shown in FIG. 6, the radial spring 86 is mounted on the protruding portion 80a in a state where the protruding portion 80a is fitted in the fitting part 86a in the radial direction and the spring part 86b is located on the inner side of the side surface 80aq of the protruding portion 80a in the radial direction. The radial spring 94 has the same shape as the radial spring 86, and therefore the description thereof will be omitted.

Figure 9:
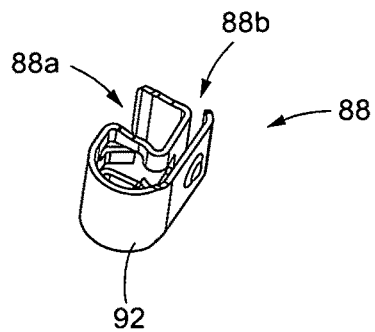
FIG. 9 is a perspective view showing another spring that is a component of the disc brake.

As shown in FIG. 9, the circumferential spring 88 is similarly formed by curving a plate member 92 having an elongated shape, and includes a fitting part 88a and a spring part 88b that is formed by being folded so as to leave a clearance to a bottom surface of the fitting part 88a. For example, as shown in FIG. 3, the circumferential spring 88 is mounted on the protruding portion 80b in a state where the protruding portion 80b is fitted in the fitting part 88a in the axial direction and the spring part 88b is located on an inner side of a top surface 80bt in the circumferential direction.

As shown in FIG. 3 and FIG. 6, when the first engaging protrusion 80 is engaged with the first engaging recess 40, the spring part 86b of the radial spring 86 is located between the side surface 80aq of the protruding portion 80a and the wall surface 40b of the first engaging recess 40, while the spring part 88b of the circumferential spring 88 is located between the top surface 80bt of the protruding portion 80b and the bottom surface 40c of the first engaging recess 40. With the radial springs 86, 94 and the circumferential springs 88 thus provided between the main housing section 28 and the frame 16, shifts in the position of the frame 16 relative to the main housing section 28 in the radial direction and the circumferential direction are absorbed. As a result, the frame 16 can be positioned, and the frame 16 can be appropriately moved in the axial direction. Moreover, external forces acting between the frame 16 and the main housing section 28 in the radial direction and the circumferential direction are absorbed by the radial springs 86, 94 and the circumferential springs 88, so that vibration and abnormal noise of the frame 16 can be reduced. Furthermore, these springs can improve the installability of the frame 16 onto the main housing section 28. In addition, the inclined portions 86c allow the protruding portion 80a to be easily inserted into the first engaging recess 40.

Figure 12:
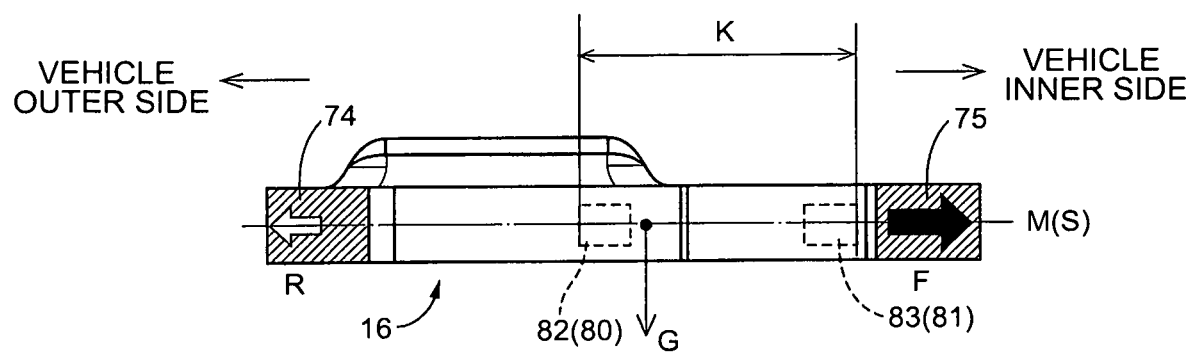
FIG. 12 is a view showing an applied state of the disc brake.

In this embodiment, as shown in FIG. 12, the frame 16 is designed such that, as seen in a side view, a center of gravity G of the frame 16 is located between the holding portions of the frame 16 in the main housing section 28 (range K), in other words, between end surfaces of the first engaging protrusions 80, 82 on the vehicle outer side and end surfaces of the second engaging protrusions 81, 83 on the vehicle inner side. The center of gravity G does not move out of the range K even when the frame 16 is moved in the axial direction. When the inner pad 4 and the outer pad 6 wear, the position of the frame 16 relative to the main housing section 28 in an unapplied state of the disc brake 2 is moved toward the vehicle inner side. Therefore, the center of gravity G of the frame 16 remains inside the range K even when the inner pad 4 and the outer pad 6 wear.

Figure 10:
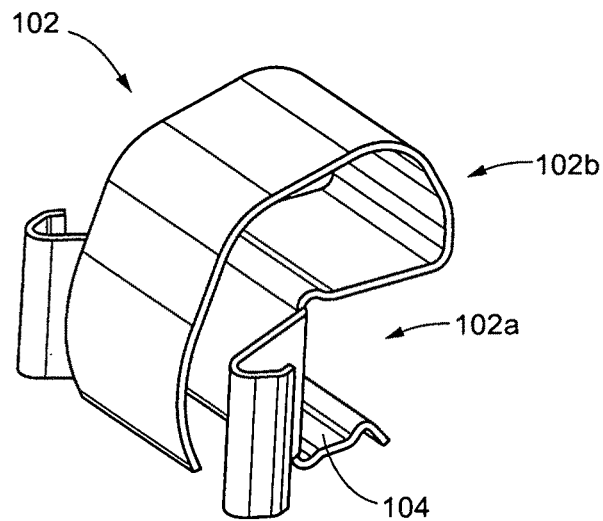
FIG. 10 is a perspective view showing yet another spring that is a component of the disc brake.

On the other hand, as shown in FIG. 7, a protrusion 100 protruding in the axial direction is provided in a surface of the second edge 75 facing the second piston 26. The protrusion 100 has a shape defined by a curved surface, i.e., a round shape, in the circumferential direction, and a coupling spring 102 as an elastic member is mounted on the protrusion 100. As shown in FIG. 10, the coupling spring 102 is a leaf spring and formed by bending a plate member 104. The coupling spring 102 has a fitting part 102a that is bent into a substantially U-shape, and a spring part 102b that is formed by being folded with a clearance left to a side surface of the fitting part 102a. Since the interval between portions of the plate member 104 in the spring part 102b is large, the spring force of the coupling spring 102 is small.

As shown in FIG. 2, the coupling spring 102 is mounted on the protrusion 100 in a state where the protrusion 100 is fitted in the fitting part 102a in the radial direction and the spring part 102b is located on the outer side of the protrusion 100 in the radial direction. When the protrusion 100 is engaged in a hollow cylindrical portion 106 of the second piston 26 in this state, the spring part 102b of the coupling spring 102 is located between the protrusion 100 and an inner circumferential surface 106f of the hollow cylindrical portion 106 of the second piston 26. By thus engaging the frame 16 and the second piston 26 through the coupling spring 102, it is possible to position the frame 16 relative to the second piston 26 in the radial direction and at the same time allow the frame 16 and the second piston 26 to move integrally in the axial direction.

Therefore, when the disc brake 2 is released, the frame 16 can be moved in the direction of an arrow Y in FIG. 11 as the second piston 26 is returned to an original position (a position in the unapplied state of the disc brake 2), and the outer pad 6 can be appropriately separated from the rotor 3 so as to avoid dragging. Since the protrusion 100 has a round shape in the circumferential direction, engagement with the second piston 26 through the coupling spring 102 is less likely to make the frame 16 to turn upon actuation of the disc brake 2. Moreover, since the spring force of the coupling spring 102 is small, torsion etc. of the second piston 26 is appropriately avoided. A rubber member etc. as an elastic member can be provided instead of the coupling spring 102.

In the frame 16 according to this embodiment, as shown in FIG. 2, a ratio (H/D) of a thickness (a length in the radial direction) H of the first edge 74 and the second edge 75 of the frame 16 relative to a diameter D of the cylinder bore 21 of the main housing section 28 is about 0.33. The ratio of the thickness of the first edge 74 and the second edge 75 relative to the diameter of the cylinder bore 21 is thus a relatively large value, which makes it possible to appropriately actuate the disc brake 2 and improve the reliability. The ratio (H/D) may be any value not smaller than 0.17, but is desirably not smaller than 0.2.

E. Actuation and Applied State of Disc Brake

The disc brake 2 configured as has been described above is actuated when a fluid pressure is supplied from a fluid pressure supply device (not shown) to the fluid pressure chamber 30. In the applied state of the disc brake 2, as shown in FIG. 12, a force F and a force R (a reaction force to the force F) act on the frame 16 in a direction parallel to the axis M.

Figure 13:
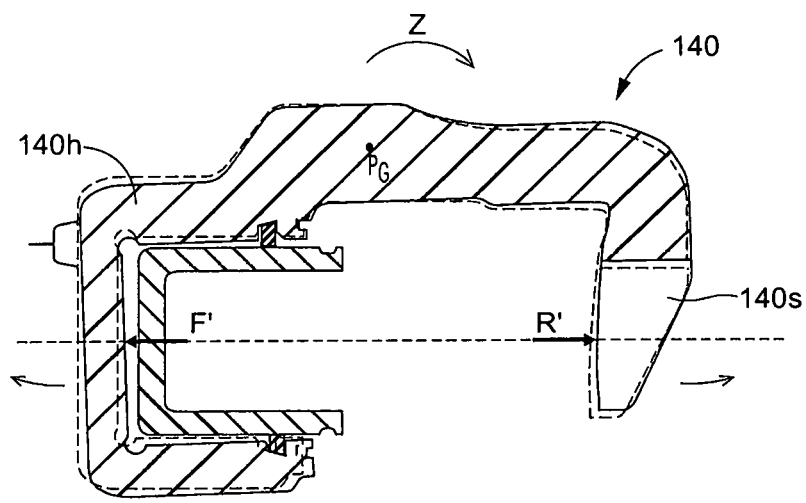
FIG. 13 is a view showing a conventional disc brake.

On the other hand, as shown in FIG. 13, in a disc brake including a caliper 140 shaped so as to straddle a rotor, an inner pad, and an outer pad, the centroid of a contact part between a claw 140s of the caliper and the outer pad is located farther on an inner circumferential side than the centroid of a contact part between a piston and the inner pad. For this reason, upon actuation of the disc brake, a moment occurs on the caliper 140 in the direction of an arrow Z, which may result in displacement of the outer pad toward the inner side in the radial direction. Moreover, a part at which the caliper 140 is held by a mounting bracket (the part represented by a point PG in FIG. 13; for example, this point can be the center of a slide pin) and the points of action of reaction forces F', R' to a pressing force acting on the caliper 140 are distanced from each other. For this reason, in an applied state of the disc brake, the caliper 140 is deformed so as to increase the interval between the claw 140s and a cylinder holding part 140h, which may result in a decrease in the pressing force.

By contrast, in the disc brake 2, the lines of action of the forces F, R are located in the same plane (in this embodiment, in the central reference plane) as shown in FIG. 12, so that inclination of the frame 16 upon actuation of the disc brake 2 can be reduced. Moreover, the lines of action of the forces F, R and the center points of the holding portions of the frame 16 in the main housing section 28 are located in the same plane, which makes it possible to reduce deformation of the frame 16 in the applied state of the disc brake 2, and to avoid a decrease in the pressing force due to deformation of the frame 16. Since a decrease in the pressing force due to deformation of the frame 16 can be thus avoided, weight reduction and downsizing of the frame 16 can be achieved accordingly.

The pad pins 34, 35 are held at both ends by the housing 10. Therefore, the orientation of the inner pad 4 and the outer pad 6 can be stably maintained, and slipping down of the outer pad 6 toward the inner side in the radial direction can be appropriately avoided.

The pad pins 34, 35 are mounted on the housing 10 without using screw fastening. As a result, the processing cost can be reduced and the work efficiency can be improved. Moreover, since screw fastening is not used, the pad pins 34, 35 can be easily removed and the inner pad 4 and the outer pad 6 can be easily replaced.

The wheel cylinder 14 is formed in the main housing section 28, which can eliminate the need for high processing accuracy for the frame 16. Accordingly, manufacturing the frame 16 requires less processing such as cutting and polishing, so that the manufacturing cost of the frame 16 can be reduced. For example, the frame 16 can be manufactured also by press working, which results in a reduction of the manufacturing cost of the entire disc brake.

In the embodiment configured as has been described above, the radial springs 86, 94 are an example of the first elastic member, and the coupling spring 102 are an example of the second elastic member. The wall surfaces 40b, 41b, 42b, 43b of the first engaging recesses 40, 41 and the second engaging recesses 42, 43 of the main housing section 28, the side surfaces 80aq, 82aq, 81q, 83q of the first engaging protrusions 80, 82 and the second engaging protrusions 81, 83 of the frame 16, etc. are examples of the engaging surfaces. The hollow cylindrical portion 106 of the second piston 26 is an example of the recess described in the claims.

F. Others

For example, an electric vehicle etc. having a high-capacity electricity storage device can output a large regenerative braking force, and therefore has less need to output a large braking force by a frictional brake. Accordingly, materials for manufacturing the frictional brake can be designed with a high degree of freedom; for example, the housing 10 can be manufactured from metal containing aluminum (e.g., aluminum alloy) and the frame 16 can be manufactured from carbon fiber-reinforced plastic (CFRP).

In this case, weight reduction of the disc brake 2 can be achieved and the travel distance relative to power can be increased. A part of the frame 16 that comes close to the outer pad 6 in the circumferential direction serves as a torque receiving part T. Here, plastic has a high damping property. It is therefore possible to reduce vibration and brake noise in the applied state of the disc brake 2.

By contrast, if the housing 10 and the frame 16 are manufactured from iron, a problem arises such as that, as the iron housing 10 and the iron frame 16 slide over each other upon actuation of the disc brake 2, rust on the housing 10 and rust on the frame 16 may stick to each other and may make relative movement difficult. Such sticking of rust can be avoided when the housing 10 is manufactured from aluminum alloy and the frame 16 is manufactured from carbon fiber-reinforced plastic.

It is desirable that the third edge 77 and the fourth edge 78 be manufactured such that the direction of the carbon fibers and the axial direction coincide with each other, in other words, the carbon fibers have a high degree of orientation in the axial direction. Thus, the strength of the frame 16 against a force acting in the axial direction can be enhanced, and deformation due to the forces F, R can be appropriately reduced.

Springs manufactured from a stainless material can be adopted as the radial springs 86, 94 and the circumferential springs 88. The stainless material is a material having a corrosion potential between the corrosion potentials of aluminum alloy and carbon fiber-reinforced plastic (carbon). As described above, the first engaging recesses 40, 41 and the first engaging protrusions 80, 82, and the second engaging recesses 42, 43 and the second engaging protrusions 81, 83, come into surface-to-surface engagement with each other. Therefore, if the radial springs 86, 94 and the circumferential springs 88 are not provided, the housing 10 may corrode due to sliding of the surfaces over each other upon actuation of the disc brake 2. However, when the springs 86, 94, 88 manufactured from a material having a corrosion potential between the corrosion potentials of the housing 10 and the frame 16 are interposed between the housing 10 and the frame 16, the difference in the corrosion potential can be reduced. As a result, corrosion of the housing 10 is less likely to occur compared with if the housing 10 and the frame 16 are directly brought into sliding contact with each other.

It is not essential that the center points of the holding portions of the frame 16 in the main housing section 28 are located in the central reference plane. For example, the center points of the holding portions, i.e., the center points of the first engaging recesses 40, 41 and the second engaging recesses 42, 43 in the radial direction and the center points of the first engaging protrusions 80, 82 and the second engaging protrusions 81, 83 in the radial direction, can be located in the same plane parallel to the central reference plane S, or the engaging surfaces (side surfaces) of the first engaging recesses 40, 41 and the second engaging recesses 42, 43 and the engaging surfaces (wall surfaces) of the first engaging protrusions 80, 82 and the second engaging protrusions 81, 83 can be located in the same plane parallel to the central reference plane S.

It is not essential that the springs 86, 88, 94 are interposed between the first engaging recesses 40, 41 and the second engaging recesses 42, 43 provided in the main housing section 28 and the first engaging protrusions 80, 82 and the second engaging protrusions 81, 83 provided in the frame 16. Each of the numbers of the engaging recesses and the engaging protrusions to be provided can be three or larger, or only a pair of engaging recess and engaging protrusion can be provided.

The engaging recesses can be provided in the frame 16 and the engaging protrusions can be provided in the main housing section 28. The radial spring 86 can be mounted on the protruding portion 80a in a state where the spring part 86b is located on the outer side of the protruding portion 80a in the radial direction.

The bridge 32 may have any shape. For example, the rods 50, 52 may be provided so as to extend in a direction intersecting the axis M.

Embodiment 2

Figure 14:
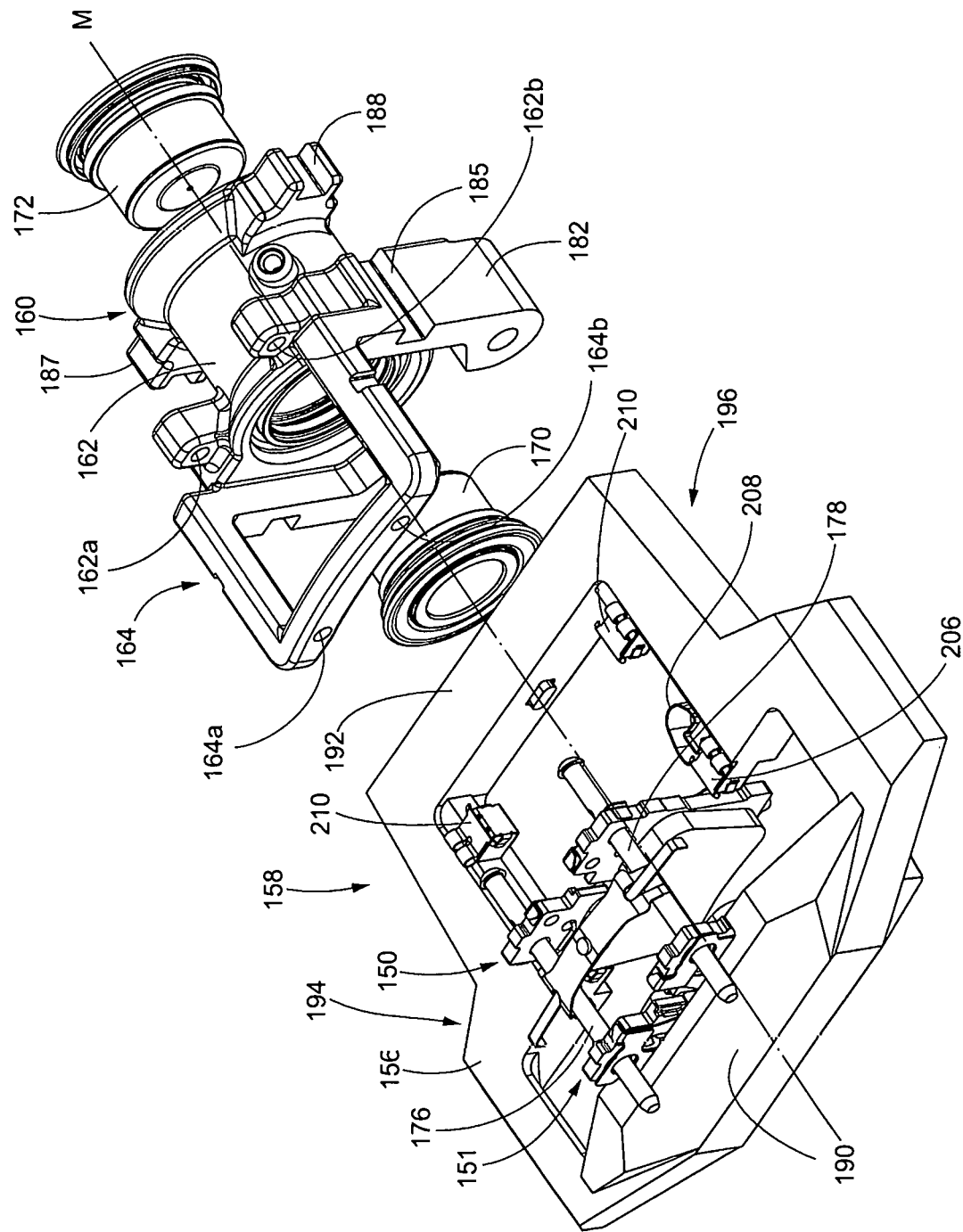
FIG. 14 is an exploded perspective view of main parts of a disc brake according to Embodiment 2 of the present disclosure.
Figure 15:
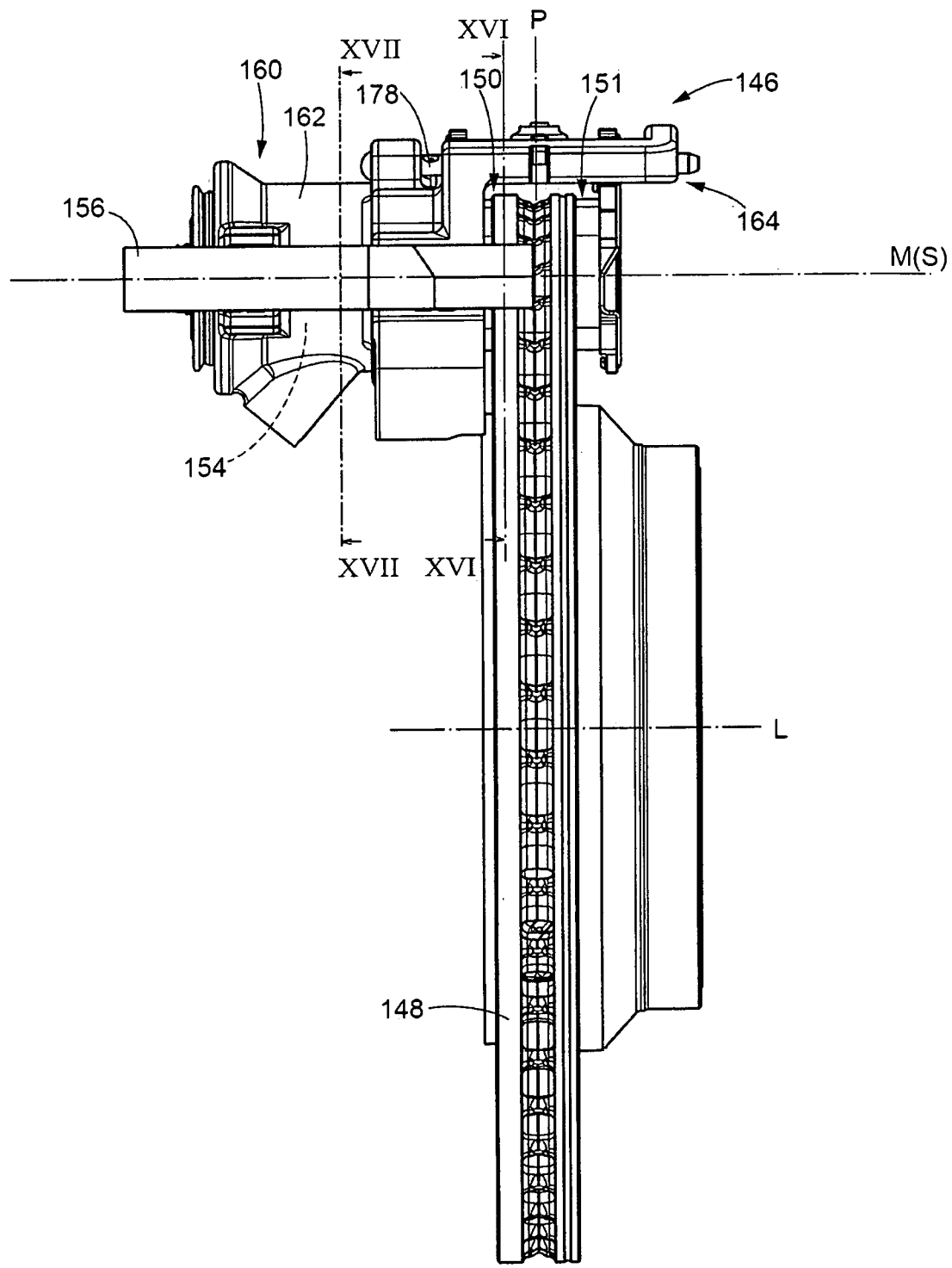
FIG. 15 is a side view of the disc brake.

As shown in FIG. 14 and FIG. 15, a floating hydraulic disc brake 146 according to this embodiment includes: (a) an inner pad 150 and an outer pad 151 located respectively on both sides of a rotor 148; (b) a pressing device 158 including a wheel cylinder 154 and a frame 156; and (c) a housing 160 that is mounted on a non-rotating body and holds the pressing device 158. The housing 160 includes a main housing section 162 in which a cylinder bore is formed, and a bridge 164 that extends beyond the rotor 148. A first piston 170 and a second piston 172 are fluid-tightly and slidably fitted in the cylinder bore formed in the main housing section 162, and a space between the first piston 170 and the second piston 172 serves as a fluid pressure chamber. The inner pad 150 and the outer pad 151 are held by a pair of pad pins 176, 178 provided so as to be separated from each other in a circumferential direction of the rotor 148. The pad pins 176, 178 extend in a direction parallel to a rotational axis L of the rotor 148 (since the rotational axis L of the rotor 148 and an axis M of the pressing device 158 are parallel to each other, this direction may be hereinafter referred to as a direction parallel to the axis M, an axial direction, etc.), and are held at one end in through-holes 162a, 162b of the main housing section 162 and held at the other end in through-holes 164a, 164b of the bridge 164. The part of the main housing section 162 at which the cylinder bore is formed, the first piston 170, the second piston 172, etc. constitute the wheel cylinder 154.

The main housing section 162 has a pair of mounted portions 180 (see FIG. 16), 182 at which the main housing section 162 is mounted on a vehicle body-side member, such as a knuckle, that is a non-rotating body. A pair of first engaging recesses 184 (see FIG. 14), 185 and a pair of second engaging recesses 187, 188 are provided respectively at both ends of the main housing section 162 in the axial direction, on both sides of these ends.

Figure 18:
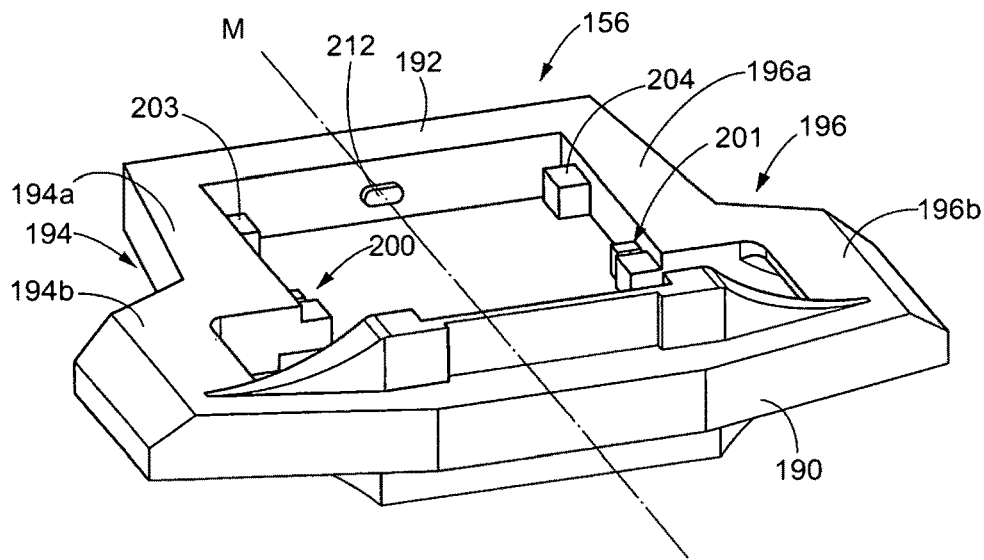
FIG. 18 is a perspective view of a frame of the disc brake.

As shown in FIG. 18, the frame 156 includes a first edge 190 and a second edge 192 that extend substantially in a direction orthogonal to the axis M and are separated from each other in the axial direction, and a third edge 194 and a fourth edge 196 that are provided so as to be separated from each other in a direction orthogonal to the axis M and connect the first edge 190 and the second edge 192 to each other. The third edge 194 and the fourth edge 196 have a curved shape, and portions thereof farther on the vehicle inner side than the rotor 148 (these portions will be hereinafter referred to as inner portions) 194a, 196a have surfaces facing each other that extend roughly parallel to the axis M. The interval between portions of the third edge 194 and the fourth edge 196 above the rotor 148 (portions farther on the vehicle outer side than the inner portions 194a, 196a; these portions will be hereinafter referred to as outer portions) 194b, 196b is larger than the interval between the inner portions 194a, 196a.

In this embodiment, a first engaging protrusion 200 and a second engaging protrusion 203, and a first engaging protrusion 201 and a second engaging protrusion 204, are provided respectively in surfaces of the inner portions 194a, 196a facing each other. As the first engaging protrusions 200, 201 are engaged with the first engaging recesses 184, 185 and the second engaging protrusions 203, 204 are engaged with the second engaging recesses 187, 188, the frame 156 is held by the main housing section 162 so as to be movable in a direction parallel to the axis M. Springs 206, 208, 210 can be provided between the first engaging protrusions 200, 201 and the first engaging recesses 184, 185 and between the second engaging protrusions 203, 204 and the second engaging recesses 187, 188. Springs similar in shape to the springs 86, 88, 94 of Embodiment 1 can be adopted as the springs 206, 208, 210, respectively. A protrusion 212 extending in the axial direction is provided in the second edge 192, and the second piston 172 is engaged with the protrusion 212 through an elastic member (not shown).

Figure 16:
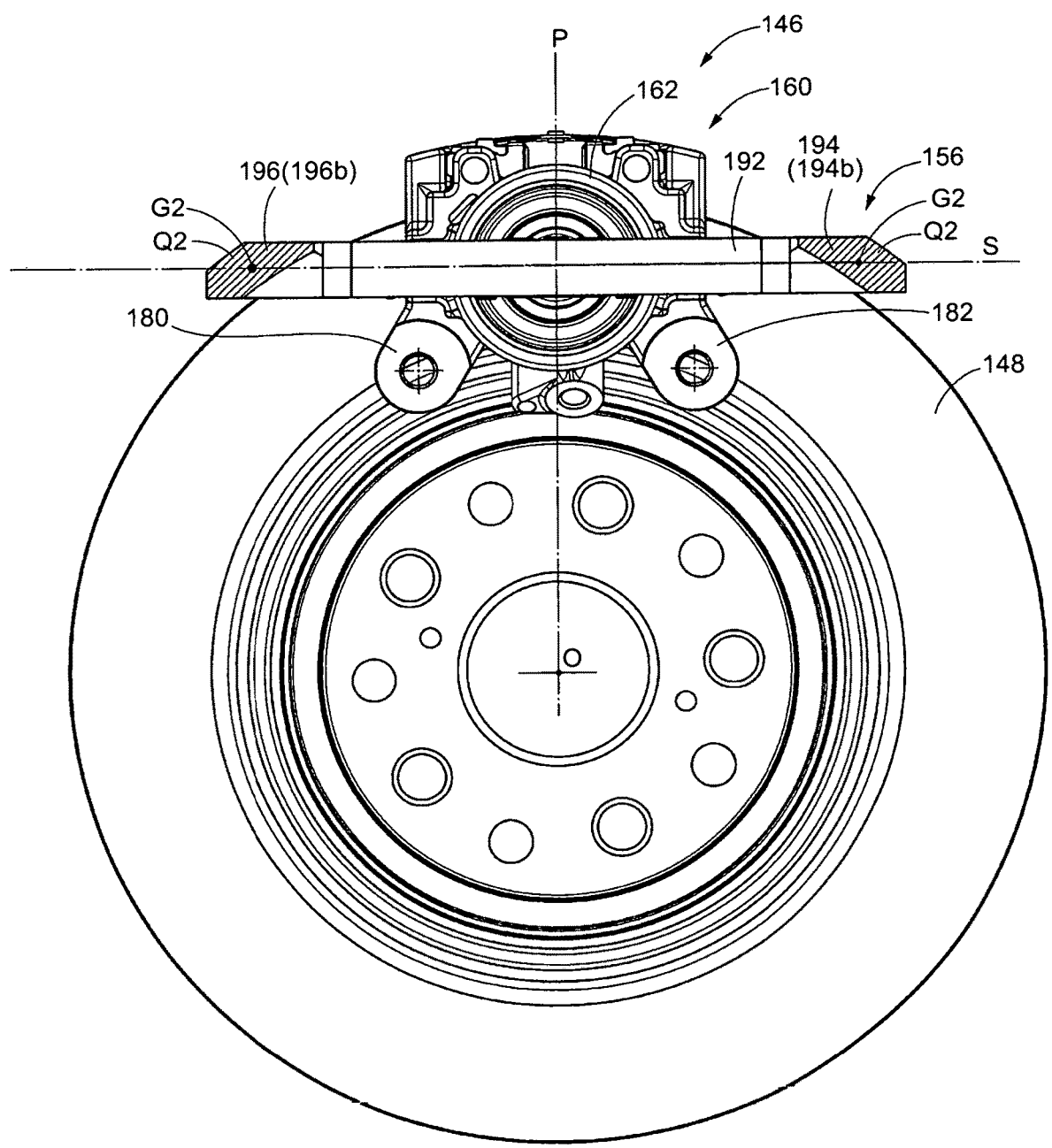
FIG. 16 is a back view of the disc brake (including section XVI-XVI in FIG. 15 and FIG. 19)
Figure 17:
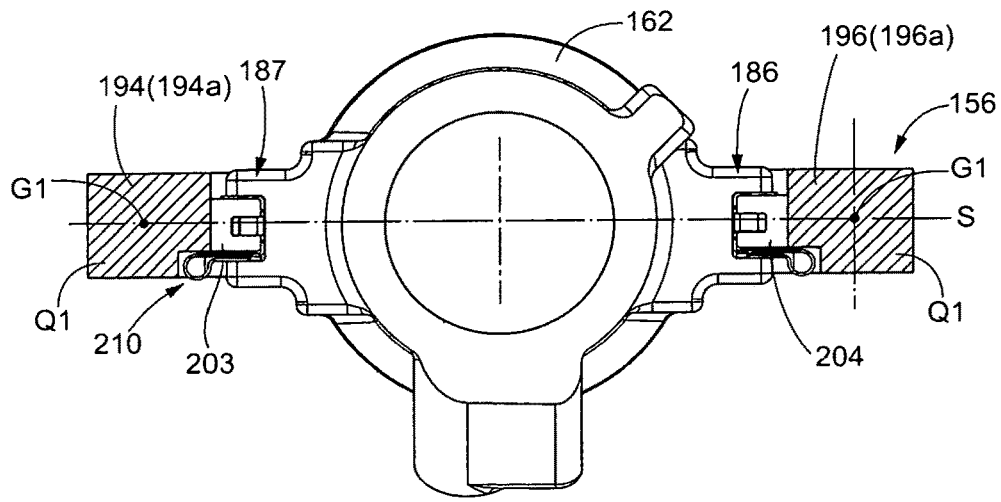
FIG. 17 is a sectional view of the disc brake (including section XVII-XVII in FIG. 15 and FIG. 19)

The centroid of each of cross-sections of the third edge 194 and the fourth edge 196 of the frame 156 extending in the direction orthogonal to the axis M is located roughly in the central reference plane S. To be more exact, these centroids may be located away from the central reference plane S, but can be regarded as being located substantially in the central reference plane. For example, FIG. 17 shows a view of section XVII-XVII in FIG. 15, in other words, a view including section XVII-XVII of the inner portions 194a, 196a in FIG. 19. It can be seen from FIG. 17 that centroids G1 of cross-sections Q1 of the inner portions 194a, 196a are located in the central reference plane S. FIG. 16 shows a view of partial section XVI-XVI in FIG. 15, in other words, a view including section XVI-XVI of the outer portions 194b, 196b in FIG. 19. It can be seen from FIG. 16 that centroids G2 of cross-sections Q2 of the outer portions 194b, 196b are located in the central reference plane S. A cross-section of the frame 156 is a cross-section thereof at a part that does not include the first engaging protrusions 200, 201 and the second engaging protrusions 203, 204.

Figure 19:
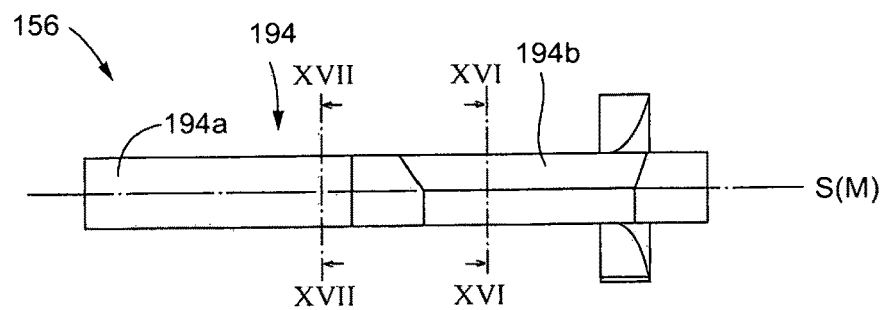
FIG. 19 is a side view of the frame.

In this embodiment, as shown in FIG. 19, the thickness of the third edge 194 and the fourth edge 196 in the radial direction is constant in the axial direction. On the other hand, the third edge 194 and the fourth edge 196 are designed such that, while the cross-sectional shapes thereof are different between the inner portions 194a, 196a and the outer portions 194b, 196b, the centroids thereof are located at the same position in the radial direction.

Alternatively, the frame 156 can be designed such that the centroid of each of cross-sections of the third edge 194 and the fourth edge 196 of the frame 156 extending orthogonal to the axis M is located at a part from which the distance to the central reference plane S is not larger than a set value. For example, this set value can be about 1 mm to 2 mm, or be a length of 1% to 5% of the thickness of the frame 156.

Thus, in this embodiment, in the applied state of the disc brake 146, the force F exerted by the second piston 172 on the frame 156 and the reaction force R exerted by the outer pad 151 on the frame 156 act on the centroids in the third edge 194 and the fourth edge 196. Therefore, bending of the third edge 194 and the fourth edge 196 can be reduced, and a decrease in the pressing force due to deformation of the frame 156 can be appropriately avoided.

Center points of the first engaging protrusions 200, 201 and the second engaging protrusions 203, 204 in the radial direction may be located in the central reference plane S or may be located away from the central reference plane S. In other words, the center points in the radial direction and the centroids of the first engaging protrusions 200, 201 and the second engaging protrusions 203, 204 may be located at the same position or away from each other in the radial direction.

Embodiment 3

Figure 20:
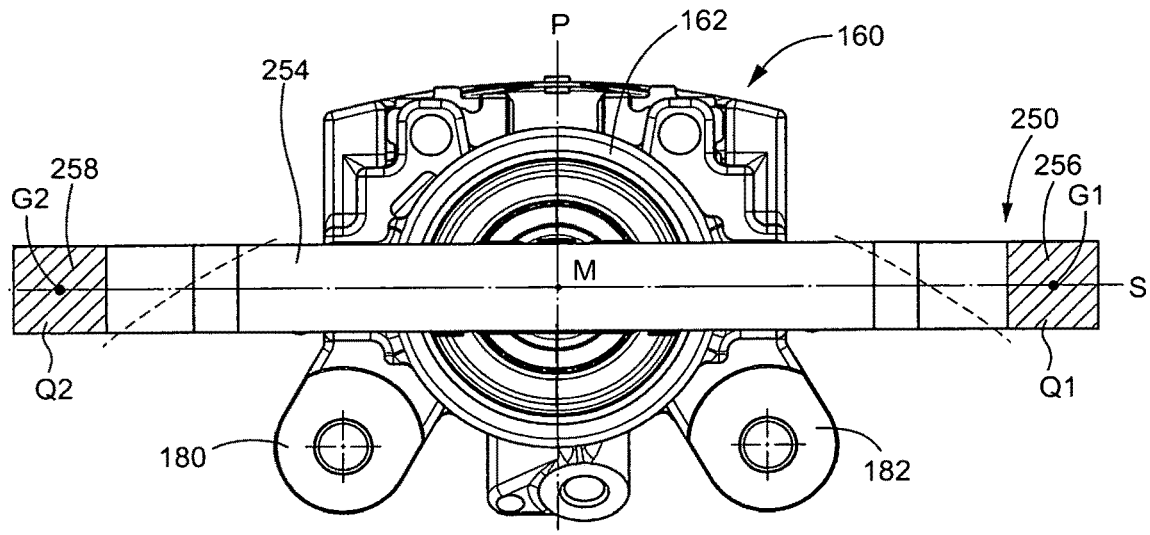
FIG. 20 is a back view of a disc brake according to Embodiment 3 of the present disclosure (including section XX-XX in FIG. 21)
Figure 21:
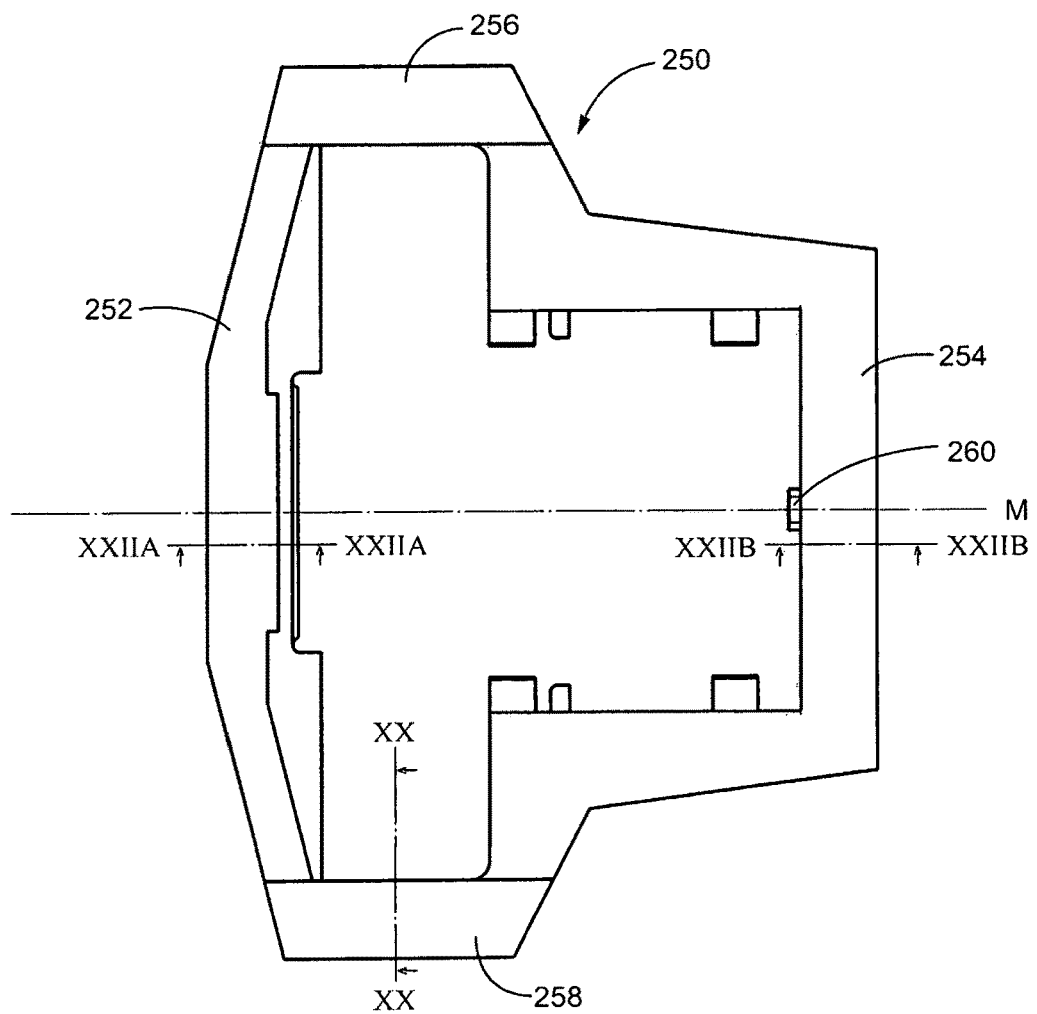
FIG. 21 is a plan view of a frame of the disc brake.
Figure 22A:
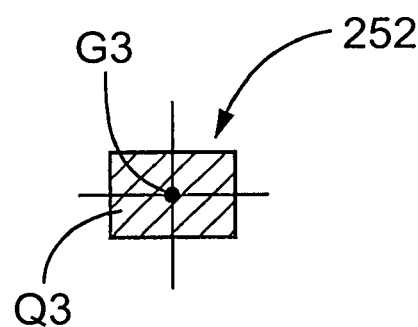
FIG. 22A is a view of section XXIIA-XXIIA in FIG. 21.
Figure 22B:
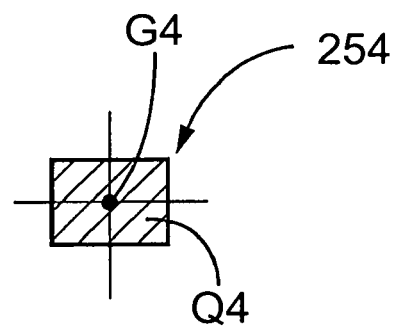
FIG. 22B is a view of section XXIIB-XXIIB in FIG. 21.

A disc brake according to this embodiment and the disc brake 146 according to Embodiment 2 are different from each other in the frame but are otherwise the same. As shown in FIG. 20 and FIG. 21, a frame 250 includes a first edge 252, a second edge 254, a third edge 256, and a fourth edge 258. Cross-sections of the third edge 256 and the fourth edge 258 extending in a direction orthogonal to the axis M have a square or rectangular shape. As shown in FIG. 22A and FIG. 22B, cross-sections of the first edge 252 and the second edge 254 extending in a direction parallel to the axis M also have a square or a rectangular shape. The thicknesses (the lengths in the radial direction) of the first edge 252, the second edge 254, the third edge 256, and the fourth edge 258 are equal.

Based on the above, centroids G1, G2 of cross-sections Q1, Q2 of the third edge 256 and the fourth edge 258 extending in a direction orthogonal to the axis M and centroids G3, G4 of cross-sections Q3, Q4 of the first edge 252 and the second edge 254 extending in a direction parallel to the axis M are all located roughly in the central reference plane. As a result, deformation of the frame 250 in the applied state of the disc brake can be further reduced. A protrusion 260 is not included in the cross-sections of the second edge 254 extending in the direction parallel to the axis M.

Embodiment 4

Figure 23:
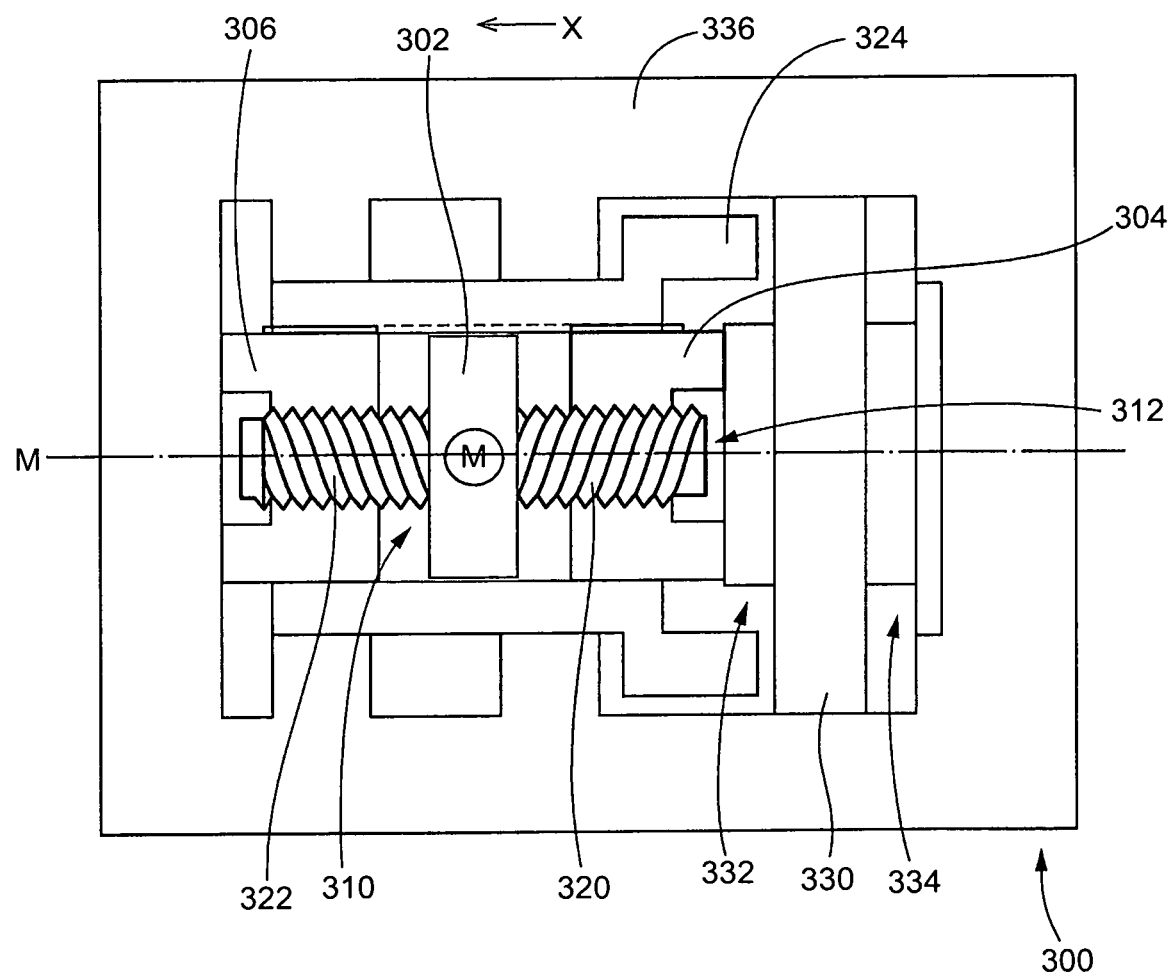
FIG. 23 is a schematic view of a disc brake according to Embodiment 4 of the present disclosure.

A disc brake according to this embodiment is a floating electric disc brake, and this disc brake is actuated by being driven by an electric motor. As schematically shown in FIG. 23, the floating electric disc brake and the disc brake of any one of above Embodiments 1 to 3 are different from each other in the pressing device but are otherwise the same.

A pressing device 300 according to this embodiment includes an electric motor 302, a first presser member 304, a second presser member 306, and a motion transmission mechanism 310 equipped with a motion conversion mechanism that converts rotation of the electric motor 302 into linear motion and transmits this motion to the first presser member 304 and the second presser member 306. The motion transmission mechanism 310 includes a screw member 312 that is rotated as a rotating shaft of the electric motor 302 rotates, and the first presser member 304 and the second presser member 306 are engaged with the screw member 312. The screw member 312 includes a right screw 320 and a left screw 322, of which the right screw 320 is engaged with the first presser member 304 and the left screw 322 is engaged with the second presser member 306. The first presser member 304 and the second presser member 306 are held by a main housing section 324 so as to be relatively movable in the axial direction but not to be rotatable.

The electric disc brake is actuated by being driven by the electric motor 302. The first presser member 304 is moved toward a rotor 330, and thereby presses an inner pad 332 toward the rotor 330. On the other hand, the second presser member 306 is moved in a direction away from the rotor 330, and thereby moves a frame 336 in the direction of the arrow X. Thus, the frame 336 presses an outer pad 334 against the rotor 330.

The present disclosure can be implemented in various other forms than the above embodiments, with various modifications and improvements made thereto based on the knowledge of those skilled in the art.

Summary

The characteristics of the configurations described in above Embodiments 1 to 4 will be itemized as follows. (1) A floating disc brake including: an inner pad and an outer pad located so as to sandwich a rotor that rotates along with a wheel; a pressing device that presses the inner pad and the outer pad against the rotor; and a housing that is mounted on a non-rotating body and holds the pressing device and holds the inner pad and the outer pad, wherein: the pressing device includes a first presser member and a second presser member that are capable of moving respectively in a direction toward the rotor and in a direction away from the rotor upon actuation of the disc brake, and a frame that is a frame-shaped ridged body, that has a first edge facing the outer pad and a second edge separated from the first edge in a direction parallel to a rotational axis of the wheel and engaging with the second presser member, and that is movable in a direction parallel to a rotational axis of the rotor; the housing includes one or more pad pins that hold the inner pad and the outer pad so as to be movable in a direction parallel to the rotational axis; and each of the one or more pad pins is held by the housing at both ends of the pad pin in a direction parallel to the rotational axis.

(2) The disc brake according to item (1), wherein: the housing includes a main housing section that holds the pressing device, and a bridge that extends from the main housing section beyond the rotor; and each of the one or more pad pins is held at one end by the main housing section and held at the other end by the bridge.

(3) The disc brake according to item (1) or (2), wherein the bridge includes a pair of rods that extends above the rotor and is separated from each other in a circumferential direction of the rotor, and a coupling part that couples together the rods on the opposite side of the rotor. The rods may extend in a direction parallel to the rotational axis or extend in a direction intersecting the rotational axis.

(4) The disc brake according to item (3), wherein the two pad pins as the one or more pad pins each extend parallel to the rotational axis, are separated from each other in the circumferential direction of the rotor, and are each held by the main housing section and the coupling part. The pad pins are passed through through-holes formed in a back plate of the inner pad and a back plate of the outer pad, and are held at one end by the main housing section and held at the other end by the coupling part. Thus, the inner pad and the outer pad are each held so as to be movable in a direction parallel to the rotational axis.

(5) The disc brake according to any one of items (1) to (4), wherein: the housing includes a main housing section that holds the pressing device, and a plurality of engaged portions provided in the main housing section; the frame includes a plurality of engaging portions capable of engaging with the plurality of engaged portions, and the frame is held by the main housing section as the plurality of engaging portions is engaged with the plurality of engaged portions; and a first elastic member that is an elastic member is provided between at least one of the plurality of engaging portions and at least one of the plurality of engaged portions.

In the disc brake according to this item, it is not absolutely necessary that the first elastic member is provided between every engaged portion and every engaging portion. The one or more first elastic members may be members that can generate an elastic force in at least one of the radial direction and the circumferential direction of the rotor. The one or more first elastic members may be the same members or different members.

(6) The disc brake according to item (5), wherein the first elastic member has a corrosion potential between the corrosion potential of the frame and the corrosion potential of the housing. For example, in a case where the housing is manufactured from a material containing aluminum and the frame is manufactured from plastic, the first elastic member can be manufactured from a material containing nickel or a stainless material.

(7) The disc brake according to any one of items (1) to (6), wherein: the housing includes a main housing section that holds the pressing device, and a plurality of engaged portions that is provided at portions of the main housing section on both sides in a direction orthogonal to the rotational axis so as to be separated from each other in a direction parallel to the rotational axis; the frame includes a third edge and a fourth edge that are provided so as to be separated from each other in a direction orthogonal to the rotational axis and each couple together the first edge and the second edge, and a plurality of engaging portions that is provided at portions of the third edge and the fourth edge facing each other and capable of engaging with the plurality of engaged portions; and the frame is held by the main housing section as the plurality of engaging portions is engaged with the plurality of engaged portions. Each of the numbers of the engaging portions and the engaged portions to be provided may be two or three or more.

(8) The disc brake according to item (7), wherein: a center point of each of the plurality of engaging portions in the radial direction and a center point of each of the plurality of engaged portions in the radial direction are located roughly in a central reference plane; and the plurality of engaging portions and the plurality of engaged portions respectively include engaging surfaces that extend parallel to the central reference plane and engage with each other.

The central reference plane is a plane that is orthogonal to a reference line and includes a center line. The reference line is a straight line orthogonal to the center line and the rotational axis of the rotor, and the center line is a straight line passing through the center of the first presser member and the center of the second presser member. In the case where the center points of the engaging portions in the radial direction and the center points of the engaged portions in the radial direction are located roughly in the central reference plane, the center points of holding portions at which the frame is held by the main housing section and the points of action of forces acting on the frame are located roughly in the same plane.

(9) The disc brake according to item (7), wherein: the center point of each of the plurality of engaging portions in the radial direction and the center point of each of the plurality of engaged portions in the radial direction is located in the same plane parallel to the central reference plane; and the plurality of engaging portions and the plurality of engaged portions respectively include engaging surfaces that extend parallel to the central reference plane and engage with each other.

(10) The disc brake according to any one of items (7) to (9), wherein, as seen in a side view, a center of gravity of the frame is located between those of the engaging portions that are located at both ends. When those of the engaging portions that are located at both ends are referred to as a first engaging portion and a second engaging portion, the center of gravity of the frame is located between an end surface of the first engaging portion on the vehicle inner side or outer side that is the opposite side from the second engaging portion and an end surface of the second engaging portion on the vehicle inner side or outer side that is the opposite side from the first engaging portion. For example, when the first engaging portion corresponds to the first engaging protrusions 80, 82 and the second engaging portion corresponds to the second engaging protrusions 81, 83, the center of gravity is located between the end surfaces of the first engaging protrusions 80, 82 on the vehicle outer side and the end surfaces of the second engaging protrusions 81, 83 on the vehicle inner side.

(11) The disc brake according to any one of items (1) to (10), wherein: the frame has a protrusion that is provided at a portion of the second edge facing the second presser member and that protrudes in a direction parallel to the rotational axis; the second presser member has a recess that is provided at a portion corresponding to the protrusion and that is recessed in a direction parallel to the rotational axis; a second elastic member that is an elastic member is provided between the protrusion and the recess; and the second edge is engaged with the second presser member through the second elastic member. The second elastic member may be a rubber member or a spring.

(12) The disc brake according to item (11), wherein the protrusion has a shape defined by a curved surface in the circumferential direction of the rotor. The protrusion has a substantially round shape. Thus, even when the frame is turned due to dragging, a shift in the position of the frame relative to the second presser member is tolerated.

(13) The disc brake according to any one of items (1) to (12), wherein the frame includes a third edge and a fourth edge that are provided so as to be separated from each other in a direction orthogonal to the rotational axis, each connect the first edge and the second edge to each other, and extend above the rotor but not above the inner pad and the outer pad. The third edge and the fourth edge reach the opposite side of the rotor by extending above the rotor without passing through the outer side of the inner pad and the outer pad in the radial direction, in other words, by straddling the rotor without straddling the inner pad and the outer pad.

(14) The disc brake according to item (13), wherein, when a straight line passing through the center of the first presser member and the center of the second presser member is defined as a center line, a straight line orthogonal to the center line and the rotational axis of the rotor is defined as a reference line, and a plane orthogonal to the reference line and including the center line is defined as a central reference plane, the centroid of each of a plurality of cross-sections of the third edge and the fourth edge extending in a direction orthogonal to the rotational axis is located in the central reference plane.

That the centroid is located in the central reference plane means that the centroid is located roughly in the central reference plane. The same applies to item (16) below.

(15) The disc brake according to item (13), wherein, when a straight line passing through the center of the first presser member and the center of the second presser member is defined as a center line, a straight line orthogonal to the center line and the rotational axis of the rotor is defined as a reference line, and a plane orthogonal to the reference line and including the center line is defined as a central reference plane, the centroid of each of a plurality of cross-sections of the third edge and the fourth edge extending in a direction orthogonal to the rotational axis is located within a range from which the distance to the central reference plane is not larger than a set value. For example, this set value can be about 1 mm to 3 mm, or a value about 1% to 5% of the thickness of the frame. The same applies to item (17) below.

(16) The disc brake according to any one of items (1) to (15), wherein, when a straight line passing through the center of the first presser member and the center of the second presser member is defined as a center line, a straight line orthogonal to the center line and the rotational axis of the rotor is defined as a reference line, and a plane orthogonal to the reference line and including the center line is defined as a central reference plane, the centroid of each of a plurality of cross-sections of the first edge and the second edge extending in a direction parallel to the rotational axis is located in the central reference plane.

(17) The disc brake according to any one of items (1) to (15), wherein, when a straight line passing through the center of the first presser member and the center of the second presser member is defined as a center line, a straight line orthogonal to the center line and the rotational axis of the rotor is defined as a reference line, and a plane orthogonal to the reference line and including the center line is defined as a central reference plane, the centroid of each of a plurality of cross-sections of the first edge and the second edge extending in a direction parallel to the rotational axis is located within a range from which the distance to the central reference plane is not larger than a set value.

(18) The disc brake according to any one of items (1) to (17), wherein: the housing includes a main housing section that holds the pressing device; the first presser member and the second presser member are a first piston and a second piston that are fluid-tightly and slidably fitted in a cylinder bore formed in the main housing section; the first piston and the second piston are each moved by a fluid pressure; and the pressing device includes a wheel cylinder composed of a part of the main housing section at which the cylinder bore is formed, the first piston, and the second piston. The disc brake according to this item is a floating hydraulic disc brake.

(19) The disc brake according to any one of items (1) to (17), wherein the pressing device includes an electric motor, and a motion transmission mechanism that converts rotation of the electric motor into linear movement and transmits this movement to the first presser member and the second presser member. The motion transmission mechanism is a mechanism that converts rotation of the electric motor into linear motion and moves the first presser member and the second presser member in opposite directions from each other. The disc brake according to this item is a floating electric disc brake.

(20) The disc brake according to any one of items (1) to (19), wherein the frame is manufactured from carbon fiber-reinforced plastic.

(21) The disc brake according to any one of items (1) to (20), wherein the frame has a torque receiving part that receives a force acting on the outer pad in the circumferential direction in an applied state of the disc brake.

(22) A floating type disc brake including: an inner pad and an outer pad located so as to sandwich a rotor that rotates along with a wheel; a pressing device that presses the inner pad and the outer pad against the rotor; and a housing that is mounted on a non-rotating body and holds the pressing device and holds the inner pad and the outer pad, wherein: the pressing device includes a first presser member and a second presser member that are movable parallel to a rotational axis of the rotor, respectively in a direction toward the rotor and in a direction away from the rotor, and a frame that is a frame-shaped rigid body, that has a first edge capable of engaging with the outer pad, a second edge separated from the first edge in a direction parallel to a rotational axis of the wheel and engaging with the second presser member, and a third edge and a fourth edge separated from each other in a direction orthogonal to the rotational axis and extending in a direction intersecting the first edge and the second edge, and that is movable in a direction parallel to the rotational axis; and when a straight line passing through the center of the first presser member and the center of the second presser member is defined as a center line, a straight line orthogonal to the center line and the rotational axis of the rotor is defined as a reference line, and a plane orthogonal to the reference line and including the center line is defined as a central reference plane, the centroid of each of a plurality of cross-sections of the third edge and the fourth edge extending in a direction orthogonal to the rotational axis is located in the central reference plane. For the disc brake according to this item, the technical characteristics according to any one of items (1) to (21) can be adopted.

(23) The disc brake according to item (22), wherein the centroid of each of a plurality of cross-sections of the first edge and the second edge extending in a direction parallel to the rotational axis is located in the central reference plane.

What is claimed is:

1. A disc brake comprising:
    an inner pad and an outer pad located so as to sandwich a rotor that rotates along with a wheel;
    a pressing device configured to press the inner pad and the outer pad against the rotor, the pressing device including
        a first presser member and a second presser member that are movable parallel to a rotational axis of the rotor, the first presser member being movable in a direction toward the rotor, the second presser member being movable in a direction away from the rotor and
        a frame that is a rigid body, the frame including a first edge facing the outer pad and a second edge separated from the first edge in a direction parallel to the rotational axis of the rotor and engaging with the second presser member, the frame being movable in the direction parallel to the rotational axis; and
    a housing mounted on a non-rotating body, the housing holding the pressing device and holding the inner pad and the outer pad, the housing including a pad pin that hold the inner pad and the outer pad so as to be movable in the direction parallel to the rotational axis, the pad pin being held by the housing at both ends of the pad pin in the direction parallel to the rotational axis, wherein:
    the housing includes a main housing section that holds the pressing device, and a plurality of engaged portions that is provided at portions of the main housing section on both sides in a direction orthogonal to the rotational axis so as to be separated from each other in the direction parallel to the rotational axis;
    the frame includes a third edge, a fourth edge, and a plurality of engaging portions, the third edge and the fourth edge being provided so as to be separated from each other in the direction orthogonal to the rotational axis and each couple together the first edge and the second edge, the plurality of engaging portions being provided at portions of the third edge and the fourth edge facing each other and engageable with the plurality of engaged portions;

the frame is held by the main housing section as the plurality of engaging portions is respectively engaged with the plurality of engaged portions; and in a side view of the frame, a center of gravity of the frame is located between those of the plurality of engaged portions that are located at both ends.

2. The disc brake according to claim 1, wherein:

the housing includes a bridge extending from the main housing section beyond the rotor to an opposite side of the rotor from the main housing section; and the pad pin is held at one end by the main housing section and held at the other end by the bridge.

3. The disc brake according to claim 1, wherein:

first elastic members that are elastic members are each provided between at least one of the plurality of engaging portions and at least one of the plurality of engaged portions.

4. The disc brake according to claim 3, wherein each of the first elastic members is formed of a stainless steel material, the frame is formed of carbon fiber-reinforced plastic, and the housing is formed of aluminum alloy.

5. The disc brake according to claim 1, wherein the first edge and the second edge extend above the rotor but not above the inner pad and the outer pad.

6. The disc brake according to claim 5, wherein when a straight line passing through a center of the first presser member and a center of the second presser member is defined as a center line, a straight line orthogonal to the center line and the rotational axis of the rotor is defined as a reference line, and a plane orthogonal to the reference line and including the center line is defined as a central reference plane, a centroid of each of a plurality of cross-sections of the third edge and the fourth edge extending in the direction orthogonal to the rotational axis is located in the central reference plane.

7. A disc brake comprising:

an inner pad and an outer pad located so as to sandwich a rotor that rotates along with a wheel;

a pressing device configured to press the inner pad and the outer pad against the rotor, the pressing device including a first presser member and a second presser member that are movable parallel to a rotational axis of the rotor, the first presser member being movable in a direction toward the rotor, the second presser member being movable in a direction away from the rotor and a frame that is a rigid body, the frame including a first edge facing the outer pad and a second edge separated from the first edge in a direction parallel to the rotational axis of the rotor and engaging with the second presser member, the frame being movable in the direction parallel to the rotational axis; and a housing mounted on a non-rotating body, the housing holding the pressing device and holding the inner pad and the outer pad, the housing including a pad pin that hold the inner pad and the outer pad so as to be movable in the direction parallel to the rotational axis, the pad pin being held by the housing at both ends of the pad pin in the direction parallel to the rotational axis, wherein:

the housing includes a main housing section that holds the pressing device, and a plurality of engaged portions that is provided at portions of the main housing section on both sides in a direction orthogonal to the rotational axis so as to be separated from each other in the direction parallel to the rotational axis;

the frame includes a third edge, a fourth edge, and a plurality of engaging portions, the third edge and the fourth edge being provided so as to be separated from each other in the direction orthogonal to the rotational axis and each couple together the first edge and the second edge, the plurality of engaging portions being provided at portions of the third edge and the fourth edge facing each other and engageable with the plurality of engaged portions;

the frame is held by the main housing section as the plurality of engaging portions is respectively engaged with the plurality of engaged portions; and in a side view of the frame, a center of gravity of the frame is located between those of the plurality of engaged portions that are located at both ends, wherein:

the frame has a protrusion that is provided at a portion of the second edge facing the second presser member and that protrudes in the direction parallel to the rotational axis;

the second presser member has a recess that is provided at a portion corresponding to the protrusion and recessed in the direction parallel to the rotational axis; and a second elastic member that is an elastic member is provided between the protrusion and the recess, and the second edge is engaged with the second presser member through the second elastic member.

8. The disc brake according to claim 7, wherein the protrusion has a shape defined by a curved surface in a circumferential direction of the rotor.

9. A disc brake comprising:

an inner pad and an outer pad located so as to sandwich a rotor that rotates along with a wheel;

a pressing device configured to press the inner pad and the outer pad against the rotor, the pressing device including a first presser member and a second presser member that are movable parallel to a rotational axis of the rotor, the first presser member being movable in a direction toward the rotor, the second presser member being movable in a direction away from the rotor and a frame that is a rigid body, the frame including a first edge facing the outer pad and a second edge separated from the first edge in a direction parallel to the rotational axis of the rotor and engaging with the second presser member, the frame being movable in the direction parallel to the rotational axis; and a housing mounted on a non-rotating body, the housing holding the pressing device and holding the inner pad and the outer pad, the housing including a pad pin that hold the inner pad and the outer pad so as to be movable in the direction parallel to the rotational axis, the pad pin being held by the housing at both ends of the pad pin in the direction parallel to the rotational axis, wherein:

the housing includes a main housing section that holds the pressing device, and a plurality of engaged portions that is provided at portions of the main housing section on both sides in a direction orthogonal to the rotational axis so as to be separated from each other in the direction parallel to the rotational axis;

the frame includes a third edge, a fourth edge, and a plurality of engaging portions, the third edge and the fourth edge being provided so as to be separated from each other in the direction orthogonal to the rotational axis and each couple together the first edge and the second edge, the plurality of engaging portions being provided at portions of the third edge and the fourth edge facing each other and engageable with the plurality of engaged portions;

the frame is held by the main housing section as the plurality of engaging portions is respectively engaged with the plurality of engaged portions; and in a side view of the frame, a center of gravity of the frame is located between those of the plurality of engaged portions that are located at both ends, wherein when a straight line passing through a center of the first presser member and a center of the second presser member is defined as a center line, a straight line orthogonal to the center line and the rotational axis of the rotor is defined as a reference line, and a plane orthogonal to the reference line and including the center line is defined as a central reference plane, a centroid of each of a plurality of cross-sections of the first edge and the second edge extending in the direction parallel to the rotational axis is located in the central reference plane.

10. A disc brake comprising:

an inner pad and an outer pad located so as to sandwich a rotor that rotates along with a wheel;

a pressing device configured to press the inner pad and the outer pad against the rotor, the pressing device including a first presser member and a second presser member that are movable parallel to a rotational axis of the rotor, the first presser member being movable in a direction toward the rotor, the second presser member being movable in a direction away from the rotor and a frame that is a rigid body, the frame including a first edge facing the outer pad and a second edge separated from the first edge in a direction parallel to the rotational axis of the rotor and engaging with the second presser member, the frame being movable in the direction parallel to the rotational axis; and a housing mounted on a non-rotating body, the housing holding the pressing device and holding the inner pad and the outer pad, the housing including a pad pin that hold the inner pad and the outer pad so as to be movable in the direction parallel to the rotational axis, the pad pin being held by the housing at both ends of the pad pin in the direction parallel to the rotational axis, wherein:

the housing includes a main housing section that holds the pressing device, and a plurality of engaged portions that is provided at portions of the main housing section on both sides in a direction orthogonal to the rotational axis so as to be separated from each other in the direction parallel to the rotational axis;

the frame includes a third edge, a fourth edge, and a plurality of engaging portions, the third edge and the fourth edge being provided so as to be separated from each other in the direction orthogonal to the rotational axis and each couple together the first edge and the second edge, the plurality of engaging portions being provided at portions of the third edge and the fourth edge facing each other and engageable with the plurality of engaged portions;

the frame is held by the main housing section as the plurality of engaging portions is respectively engaged with the plurality of engaged portions; and in a side view of the frame, a center of gravity of the frame is located between those of the plurality of engaged portions that are located at both ends, wherein the housing includes a plurality of the pad pins and both ends of each of the plurality of the pad pins in the direction parallel to the rotational axis are held by the housing.

* * * * *